United States Patent
Shi

(10) Patent No.: US 11,715,609 B2
(45) Date of Patent: Aug. 1, 2023

(54) ELECTRICAL APPLIANCE AND ELECTRICAL CONNECTION ASSEMBLY

(71) Applicants: SHANGHAI LEADING CONNECTION MECHATRONICS TECHNOLOGY CO., LTD., Shanghai (CN); JIANGSU LUOKAI MECHANICAL AND ELECTRICAL CO., LTD., Changzhou (CN)

(72) Inventor: Zheng Shi, Shanghai (CN)

(73) Assignees: SHANGHAI LEADING CONNECTION MECHATRONICS TECHNOLOGY CO., LTD., Shanghai (CN); JIANGSU LUOKAI MECHANICAL AND ELECTRICAL CO., LTD., Changzhou (CN)

( * ) Notice: Subject to any disclaimer, the term of this patent is extended or adjusted under 35 U.S.C. 154(b) by 0 days.

(21) Appl. No.: 17/420,551

(22) PCT Filed: Dec. 31, 2019

(86) PCT No.: PCT/CN2019/130243
§ 371 (c)(1),
(2) Date: Jul. 2, 2021

(87) PCT Pub. No.: WO2020/140883
PCT Pub. Date: Jul. 9, 2020

(65) Prior Publication Data
US 2022/0115188 A1 Apr. 14, 2022

(30) Foreign Application Priority Data
Jan. 2, 2019 (CN) .......................... 201910003024.5

(51) Int. Cl.
  H01H 1/50 (2006.01)
  H01H 1/36 (2006.01)
  H02B 11/04 (2006.01)

(52) U.S. Cl.
  CPC .............. *H01H 1/50* (2013.01); *H01H 1/365* (2013.01); *H02B 11/04* (2013.01)

(58) Field of Classification Search
  CPC .......... H01H 1/50; H01H 1/365; H01H 71/08; H01H 71/10; H02B 11/04; H02B 11/12;
  (Continued)

(56) References Cited

U.S. PATENT DOCUMENTS 4,531,174 A * 7/1985 Rickmann ............ H02B 11/133
                                                                439/840
5,753,875 A * 5/1998 Benke ...................... H01H 9/52
                                                                218/118

(Continued)

FOREIGN PATENT DOCUMENTS

CN      200959373 Y    10/2007
CN      101465529 A     6/2009
(Continued)

OTHER PUBLICATIONS

International Search Report issued in International Application No. PCT/CN2019/130243, dated Mar. 27, 2020 (6 pages).

*Primary Examiner* — William A Bolton
(74) *Attorney, Agent, or Firm* — Osha Bergman Watanabe & Burton LLP

(57) ABSTRACT

An electrical connection device is connected between a main body and a draw-out device of an electrical appliance having a draw-out structure. The electrical connection device includes: a draw-out device connection assembly being fixed on the draw-out device and electrically connected to inlet and outlet ends of the draw-out device; a main body connection assembly including contact pieces with a clamping (Continued)

mechanism, wherein the clamping mechanism makes the contact pieces close to and clamp main body busbars; and a flexible assembly connecting the draw-out device connection assembly and the main body connection assembly to form a conductive path. The contact pieces of the main body connection assembly are offset by adapting to the position deviation of the main body busbars. A linked electrical connection assembly is formed by the described electrical connection devices and an electrical appliance using the described electrical connection devices or the electrical connection assembly.

16 Claims, 17 Drawing Sheets

(58) Field of Classification Search
CPC . H01R 4/40; H01R 4/42; H01R 13/04; H01R 13/10; H01R 13/621; H01R 13/639; H01R 13/6315; H01R 24/005
USPC .......... 200/16 C, 16 BB, 6 BB, 16 D, 50.17, 200/50.21, 50.27; 218/75, 45, 74
See application file for complete search history.

(56) References Cited

U.S. PATENT DOCUMENTS

| | | | |
|---|---|---|---|
| 5,929,410 A * | 7/1999 | Mun .................. | H02B 11/04 218/123 |
| 6,024,589 A | 2/2000 | Hahn, IV et al. | |
| 6,139,347 A * | 10/2000 | Nebon ................ | H02B 11/04 439/821 |
| 9,070,521 B2 * | 6/2015 | Yang .................... | H01H 1/38 |
| 9,356,435 B2 * | 5/2016 | Ricciuti .............. | H02B 13/02 |
| 2015/0139275 A1 * | 5/2015 | Park .................... | G01K 13/00 374/152 |
| 2017/0170638 A1 * | 6/2017 | Waynick, Sr. ........ | H02B 1/20 |
| 2017/0338070 A1 * | 11/2017 | Kim .................. | H01H 33/6606 |

FOREIGN PATENT DOCUMENTS

| | | | | |
|---|---|---|---|---|
| CN | 103624590 A | | 3/2014 | |
| CN | 105305108 A | | 2/2016 | |
| CN | 106207518 A | | 12/2016 | |
| GB | 2268843 | * | 1/1994 | ............. H01H 11/01 |
| KR | 20170002691 | * | 7/2017 | ......... H01H 33/6606 |

* cited by examiner

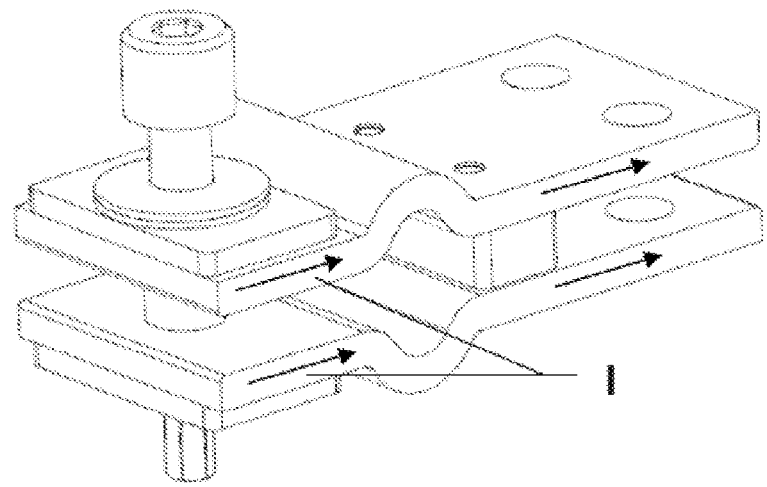
FIG 10a
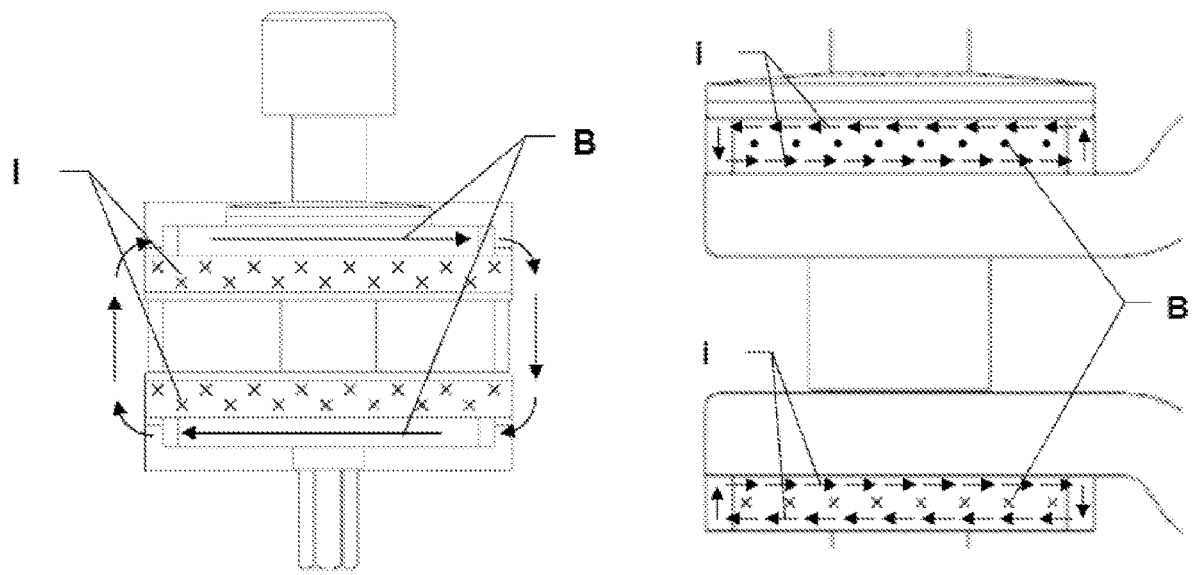
FIG 10b
FIG 10c

ELECTRICAL APPLIANCE AND ELECTRICAL CONNECTION ASSEMBLY

BACKGROUND OF THE INVENTION

1. Field of the Invention

Embodiments of the present invention relate to the field of electrical appliance, and more specifically, to electrical connection assemblies of electrical appliance with a draw-out structure.

2. The Related Art

Electrical appliances with a draw-out structure include: universal circuit breakers, molded case circuit breakers, automatic transfer switches with drawer devices, medium voltage circuit breakers, switch cabinets, etc. A device with a draw-out structure includes a main body and a draw-out device. The main body uses a bridge-type contact as the main body busbar, and the draw-out device is provided with a contact bridge for electrical connection with the main body bus bar. The contact bridge on the draw-out device is connected with external inlet and outlet terminals. When the main body is pushed into the draw-out device, the main body busbar contacts the contact bridge to form a conductive path, and the main body is connected with the external inlet and outlet terminals. When the main body is pulled out of the draw-out device, the main body busbar is separated from the contact bridge, cutting off the conductive path, and achieving isolation, which is convenient for testing or maintenance. The main body busbar and the contact bridge constitute an electrical connection device for an electrical device with a draw-out structure. In some products, the contact bridge may be mounted on the main body. In such a configuration, the electrical connection device of the electrical device with a draw-out structure is still formed by the busbar and the contact bridge, of which the basic principle is the same as the aforementioned structure.

FIG. 1a and FIG. 1b illustrate structure diagrams of an electrical connection device used in an electrical appliance with a draw-out structure according to prior art. Referring to FIG. 1a and FIG. 1b, the contact bridge mounted on the draw-out device includes: a contact piece 101, a shaft 102, a tension spring 103, and a bracket 104. There are several contact pieces 101, and two contact pieces 101 with a same shape and size are arranged oppositely to form a group. Several groups of the contact pieces are superimposed and assembled into two symmetrical rows of superimposed contact pieces. A groove is formed at a position near the middle of the outer side of each contact piece 101, and the shaft 102 is arranged in the groove. The middle part of the tension spring 103 is located between the two rows of contact pieces 101, and the two ends of the tension spring 103 are respectively fixed on a pair of shafts 102. The bracket 104 is inserted between each group of contact pieces 101, the bracket 104 is used to reduce the mutual friction between the contact pieces and acts as a partition. The bracket 104 is arranged at both ends and the middle of the two rows of contact pieces. The contact piece 101, the shaft 102, the tension spring 103 and the bracket 104 together form a contact bridge as shown in FIG. 1a and FIG. 1b. At one end of the contact bridge (the left end shown in FIG. 1a), the ends of the two rows of contact pieces facing each other together form a chuck for clamping the main body busbar 105. At the other end of the contact bridge (the right end shown in FIG. 1a), it is connected to the external inlet and outlet terminal 106 of the draw-out device.

Each contact piece 101 forms a contact that is in contact with the main body busbar 105. The two rows of contact pieces together form a multi-contact area. There is a gap between the two rows of contact pieces for placing the main body busbar 105. In order to ensure that the main body busbar 105 can form effective contact when inserted into the gap, the width of the gap is set to be smaller than the thickness of the main body busbar 105. When the main body is pushed into the draw-out device, the main body busbar 105 is inserted into the gap between the two rows of contact pieces. Since the thickness of the main body busbar 105 is greater than the gap, the main body busbar 105 will spread the two rows of contact pieces apart, the spreaded contact pieces will cause the tension spring 103 to deform. The spring force generated by the deformation of the tension spring 103 acts on the contact pieces to clamp the two rows of contact pieces inward. Under such action, with the continuous advancement of the main body busbar, the two rows of contact pieces will more and more clamp the busbar. In this way, more and more contact pieces will contact the busbar to form contacts. The more the number of contacts is, the smaller the contact resistance will be. In order to ensure a reliable contact of the contacts during the working process, the spring force of the tension spring will be increased, so that the clamping force of the contact piece on the main body busbar is increased, the number of contact points and the contact stability are ensured, and the contact resistance is reduced. However, the disadvantage of increasing the spring force of the extension spring is also very obvious: when the body is pushed into the draw-out device, the main resistance to be overcome includes the friction between the main body busbar and the contact pieces and the force required for the main body busbar to spread the two rows of contact pieces. When the spring force of the tension spring increases, the force required to spread the contact pieces and the friction between the main body busbar and the contact pieces will greatly increase. Generally, the clamping force provided by a single contact bridge is around 800 N. A three-pole circuit breaker has at least six electrical connection devices, including three inlet electrical connection devices and three outlet electrical connection devices. Therefore, increasing the clamping force will multiply the resistance for inserting the main body busbar into the contact bridge, which will finally cause large difficulty for the main body to insert into the electrical connection device, as the operating force of the driving device of the entire drawer device will be too large to bear.

In addition, the contact bridge composed of the contact piece 101, the shaft 102, the tension spring 103 and the bracket 104 only allows the contact piece to rotate in a small range in the plane where the contact piece is located, and the freedom of movement of the contact piece is extremely small. If there is a deviation in the angle of the main body busbar, the contact bridge of this structure cannot adapt to the main body busbar or eliminate the position or angle deviation of the main body busbar. This deviation will reduce the number of contact pieces that are in effective contact with the main body busbar, and the number of contacts and contact area will be reduced, which is not conducive to performance and service life. Moreover, this deviation will cause the main body busbar to be unable to be inserted directly into the gap, forming a deflection, resulting in an increase in the expansion force of the two rows of contact pieces and the friction between the main body busbar and the contact pieces. In some large housings, such as products above 4000 A, due to the wide lateral width, the position deviation of each electrical connection device is quite large, and a single inlet or outlet is provided with two or three electrical connection devices, so the operating force of the drawer device will increase exponentially.

In summary, the electrical connection device used in the prior art has the following defects: there is an obvious contradiction between the difficulty of assembly and the performance. From the perspective of performance, it is hoped that the greater the clamping force, the better, in order to increase the number of contacts, increase the contact area, and reduce the contact resistance. A larger contact area can also reduce heat generation during use and prolong the overall service life of the electrical connection device. However, the increase in clamping force will greatly increase the installation resistance, which will increase the installation difficulty exponentially, which is very unfavorable for the installation and maintenance of the equipment. If the clamping force is reduced to facilitate assembly, the insufficient clamping force will cause insufficient engagement between the main body busbar and the contact piece, a small number of contacts, and some problems such as virtual connection of the contacts. A small number of contacts will reduce the contact area and increase the contact resistance, and the virtual contact will generate a lot of heat, which will easily cause the temperature of the contact to be too high or even burn during use. The contact bridge requires high installation accuracy, and cannot adapt to and eliminate the angle or position deviation of the main body busbar. The angle or position deviation of the main body busbar will cause the contact performance to decline, which reduces the performance and service life. However, improving the angle and position accuracy of the main busbar will increase the difficulty of installation.

The structure of the electrical connection device in the prior art makes it impossible to resolve the contradiction between assembly and use performance, and only a compromise solution can be obtained between the two. However, a compromise solution cannot achieve the best performance.

SUMMARY

Embodiments of the present invention provide an electrical connection device that separates the insertion and clamping operations and can fit the main body busbar as much as possible to increase the contact area. Embodiments of the present invention further provide a linked electrical connection assembly constituted by the electrical connection device, and an electrical appliance utilizing the electrical connection device or the electrical connection assembly.

According to an embodiment of the present invention, an electrical connection device is provided. The electrical connection device is connected between a main body and a draw-out device of an electrical appliance with a draw-out structure. The electrical connection device comprises: a draw-out device connection assembly, a main body connection assembly and a flexible assembly. The draw-out device connection assembly is fixed on the draw-out device and electrically connected to the inlet and outlet ends of the draw-out device. The main body connection assembly includes contact pieces with a clamping mechanism, the clamping mechanism makes the contact pieces close to and clamp a main body busbar. The flexible assembly connects the draw-out device connection assembly and the main body connection assembly. The main body connection assembly, the flexible assembly and the draw-out device connection assembly form a conductive path. The contact pieces of the main body connection assembly are offset by adapting to the position deviation of the main body busbar, so that the contact pieces close to and clamp the main body busbar, and the flexible assembly absorbs the offset of the contact pieces by its own deformation, the offset is not transferred to the draw-out device connection assembly.

According to an embodiment of the present invention, an electrical appliance with a draw-out structure is provided. The electrical appliance comprises a main body and a draw-out device, the main body and the draw-out device have a separation position and an insertion position. The main body and the draw-out device are connected by the aforementioned electrical connection. Wherein in the separation position, the main body exits the draw-out device, the main body busbar is separated from the main body connection assembly, and the main body busbar does not contact with the contact pieces. And in the insertion position, the main body is pushed into the draw-out device, the main body busbar is inserted into the main body connection assembly, and the contact pieces close to and clamp the main body busbar.

According to an embodiment of the present invention, a linked electrical connection assembly is provided. The linked electrical connection assembly includes two electrical connection devices and a linkage mechanism connecting the two electrical connection devices. The two electrical connection devices are connected between a main body and a draw-out device of an electrical appliance with a draw-out structure, the two electrical connection devices are respectively connected to the inlet end and the outlet end of the electrical appliance, the electrical connection device comprises: a draw-out device connection assembly, a main body connection assembly and a flexible assembly. The draw-out device connection assembly is fixed on the draw-out device and electrically connected to the inlet and outlet ends of the draw-out device. The main body connection assembly includes contact pieces with a clamping mechanism, the clamping mechanism makes the contact pieces close to and clamp a main body busbar. The flexible assembly connects the draw-out device connection assembly and the main body connection assembly. The main body connection assembly, the flexible assembly and the draw-out device connection assembly form a conductive path. The contact pieces of the main body connection assembly are offset by adapting to the position deviation of the main body busbar, so that the contact pieces close to and clamp the main body busbar, and the flexible assembly absorbs the offset of the contact pieces by its own deformation, the offset is not transferred to the draw-out device connection assembly. The linkage mechanism connects the clamping mechanisms of the two electrical connection devices, and the linkage mechanism enables the clamping mechanisms of the two electrical connection devices to act in synchronization.

According to an embodiment of the present invention, a linked electrical connection assembly is provided. The linked electrical connection assembly comprises an electrical connection device and a linkage mechanism. The electrical connection device is connected between a main body and a draw-out device of an electrical appliance with a draw-out structure, the electrical appliance has multiple phases, and the electrical connection device comprises: a draw-out device connection assembly, a plurality of main body connection assemblies and a flexible assembly. The draw-out device connection assembly is fixed on the draw-out device and electrically connected to the inlet and outlet ends of the draw-out device. Each main body connection assembly of the plurality of main body connection assemblies corresponds to one of the phases of the electrical appliance. Each main body connection assembly includes contact pieces with a clamping mechanism, the clamping mechanism makes the contact pieces close to and clamp a main body busbar. The flexible assembly connects the draw-out device connection assembly and the main body connection assembly. The main body connection assembly, the flexible assembly and the draw-out device connection assembly form a conductive path. The contact pieces of the main body connection assembly are offset by adapting to the position deviation of the main body busbar, so that the contact pieces close to and clamp the main body busbar, and the flexible assembly absorbs the offset of the contact pieces by its own deformation, the offset is not transferred to the draw-out device connection assembly. The linkage mechanism connects the clamping mechanisms of the plurality of main body connection assemblies, and the linkage mechanism enables the clamping mechanisms of the plurality of main body connection assemblies to act in synchronization.

According to an embodiment of the present invention, an electrical appliance with a draw-out structure is provided. The electrical appliance with a draw-out structure comprises a main body and a draw-out device, the main body and the draw-out device have a separation position and an insertion position. The main body and the draw-out device are connected by the aforementioned electrical connection device. Wherein in the separation position, the main body exits the draw-out device, the main body busbar is separated from the main body connection assembly, and the main body busbar does not contact with the contact pieces. And in the insertion position, the main body is pushed into the draw-out device, the main body busbar is inserted into the main body connection assembly, and the contact pieces close to and clamp the main body busbar.

The electrical connection device of the present invention structurally solves the contradiction between insertion and clamping operations. The clamping operation may be performed after the main body busbar is inserted into the contact pieces. Sufficient clamping force may be applied to ensure contact. The clamping force will not affect the assembly of the main body busbar. In addition, the electrical connection device is provided with a flexible assembly, which may absorb a certain deviation through its own deformation. The contact pieces may follow the position deviation of the main body busbar to produce a certain deviation, so that the contact pieces may fully adhere to the main body busbar to ensure contact area and contact stability. The linkage mechanism connects the clamping mechanisms of the two electrical connection devices, which are usually connected to the inlet end and the outlet end respectively. The linkage mechanism enables multiple sets of electrical connection devices to clamp their respective main body busbars in synchronization, which simplifies the operation mode.

According to the present invention, when the main body busbar is inserted into the electrical connection device, it can be realized that there is no mutual force between the main body busbar and the electrical connection device, such as the expansion force for expanding the contact pieces and the friction force between the main body busbar and the contact pieces in the prior art. A driving mechanism of the draw-out device can push the main body of the electrical appliance with a very small force, and makes the main body busbar be inserted into the electrical connection device.

The electrical connection device can be configured with a large clamping force to clamp the main body busbar according to the requirements, so that the overall contact resistance of the electrical device is reduced, especially in the long-term use, the power consumption is reduced, and the use cost is saved. The higher the rated current is, the more significant this advantage is. On the other hand, the reduction in contact resistance reduces the temperature rise of the product and the heat generation of the electrical device. It is no longer necessary to consider a large heat dissipation space, which is effective in reducing the size of the product and improving the reliability of long-term use.

In addition to providing greater clamping force, the presence of the elastic member also absorbs the deviation of the clamping stroke between the two electrical connection devices, so that the difference in the clamping force of the two electrical connection devices after synchronous action is very small, and both maintain a large clamping force.

BRIEF DESCRIPTION OF THE DRAWINGS

The above and other features, properties and advantages of the present invention will become more apparent through the following description in conjunction with the accompanying drawings and embodiments. In the accompanying drawings, the same reference numerals always indicate the same features, in which:

FIG. 10a, FIG. 10b and FIG. 10c illustrate principle diagrams of eliminating eddy current loss by the electrical connection device of the present invention.

DETAILED DESCRIPTION OF EMBODIMENTS

Embodiments of the present invention provide an electrical connection device that separates the insertion and clamping operations and may fit the main body bus bar as much as possible to increase the contact area. Embodiments of the present invention further provide a linked electrical connection assembly formed by the electrical connection device, and an electrical appliance utilizing the electrical connection device or the electrical connection assembly.

Figure 1A:
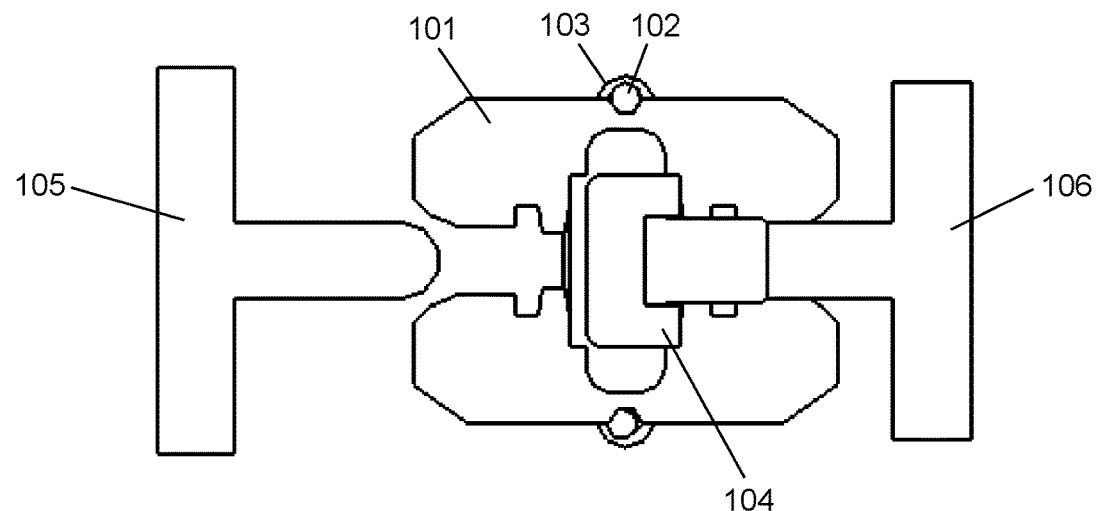
FIG. 1a and FIG. 1b illustrate structure diagrams of an electrical connection device used in an electrical appliance with a draw-out structure according to prior art.
Figure 1B:
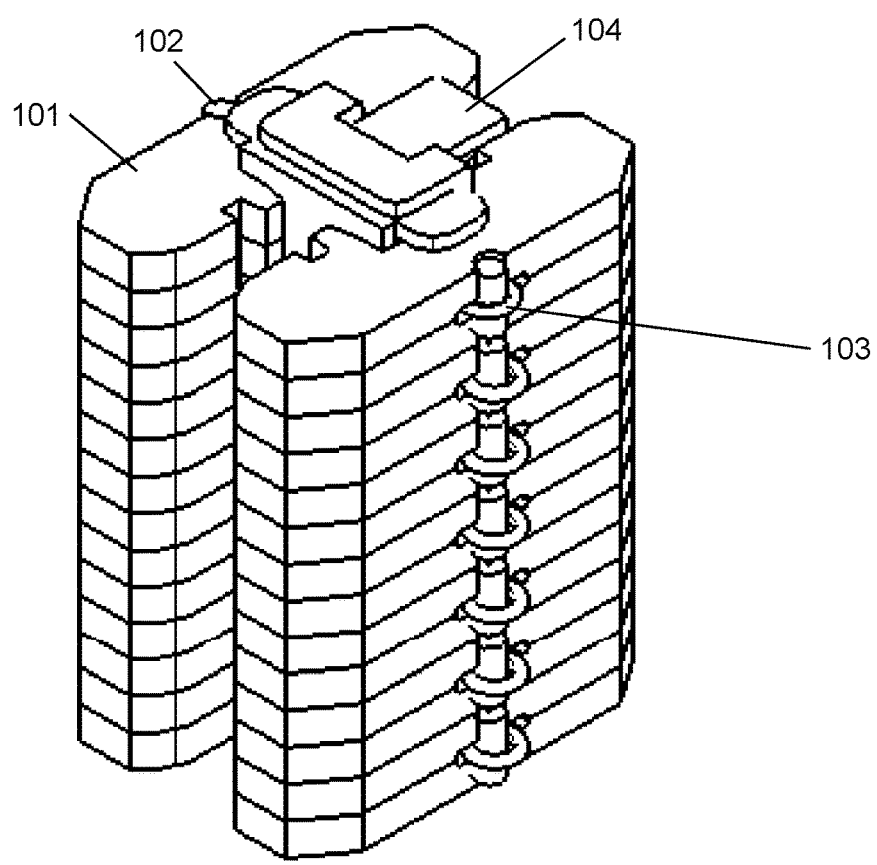
Figure 2A:
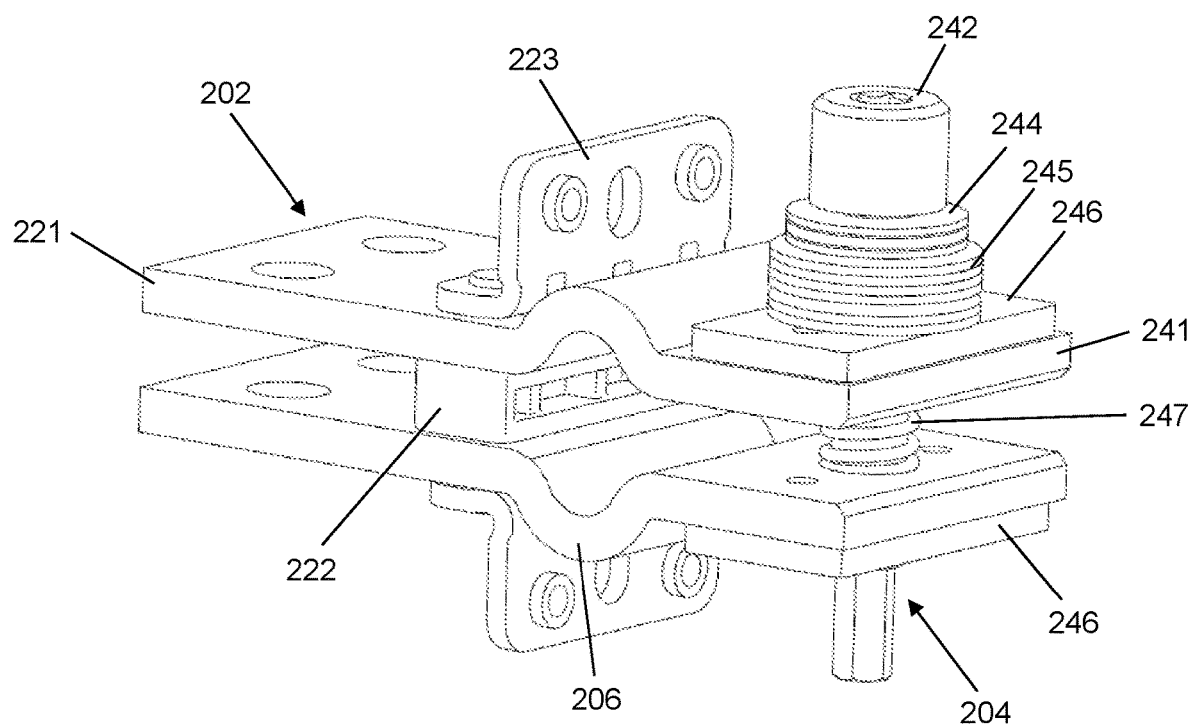
FIG. 2a and FIG. 2b illustrate structure diagrams of an electrical connection device according to a first embodiment of the present invention.
Figure 2B:
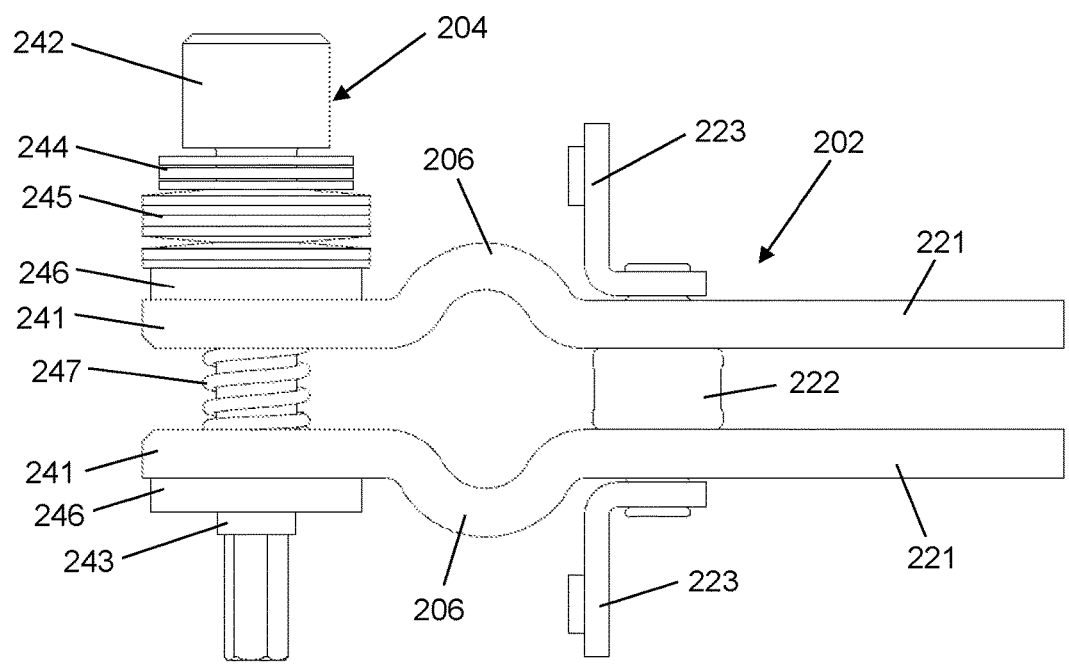

The electrical connection device is introduced in advance. FIG. 2a and FIG. 2b illustrate structure diagrams of an electrical connection device according to a first embodiment of the present invention, where FIG. 2a is a three-dimensional structure diagram of the electrical connection device, and FIG. 2b is a side structure diagram of the electrical connection device. As shown in the drawings, the electrical connection device comprises a draw-out device connection assembly 202, a main body connection assembly 204 and a flexible assembly 206. The draw-out device connection assembly 202 is fixed on a draw-out device and is electrically connected to the inlet and outlet ends of the draw-out device. The main body connection assembly 204 includes contact pieces with a clamping mechanism. The clamping mechanism makes the contact pieces close to and clamp a main body busbar. The flexible assembly 206 connects the draw-out device connection assembly 202 and the main body connection assembly 204. The main body connection assembly 204, the flexible assembly 206 and the draw-out device connection assembly 202 form a conductive path. The contact pieces of the main body connection assembly 204 are offset so as to adapt the position deviation of the main body busbar, so that the contact pieces close to and clamp the main body busbar. The flexible assembly 206 absorbs the offset of the contact pieces by its own deformation, then the offset is not transferred to the draw-out device connection assembly 202. During the installation process of the main body busbar, it is inevitable that slight deviations of position, angle or shape will occur. The electrical connection device of the present invention absorbs this deviation of the main body busbar through the flexible component 206. The contact pieces of the main body connection assembly of the electrical connection device of the present invention may follow the actual state of the main body busbar, close to and clamp the main body busbar. If the main body busbar has a position or angle deviation, the contact pieces of the main body connection assembly 204 will generate a corresponding position or angle deviation. In this way, the position or angle deviation of the main body busbar will not affect the contact performance, and the contact pieces of the main body connection assembly will ensure the contact area and contact stability with the main body busbar. The flexible assembly 206 has the ability to deform within a certain range. In one embodiment, the flexible assembly 206 is formed of a multilayer copper foil, a multilayer copper tape or a copper braided wire. If the contact pieces of the main body connection assembly 204 are offset following the position or angle deviation of the body busbar, the flexible assembly 206 absorbs the offset of the contact pieces with its own deformation, so that the offset is not transmitted to the draw-out device connection assembly 202. The draw-out device connection assembly 202 is fixed on the draw-out device and connected to the inlet and outlet ends of the draw-out device. The draw-out device connection assembly 202 is a rigid structure, of which the position and installation angle cannot be changed. By using the deformation of the flexible assembly 206, the position or angle deviation of the contact pieces of the main body connection assembly 204 is absorbed and will not be transmitted to the draw-out device connection assembly.

Figure 3A:
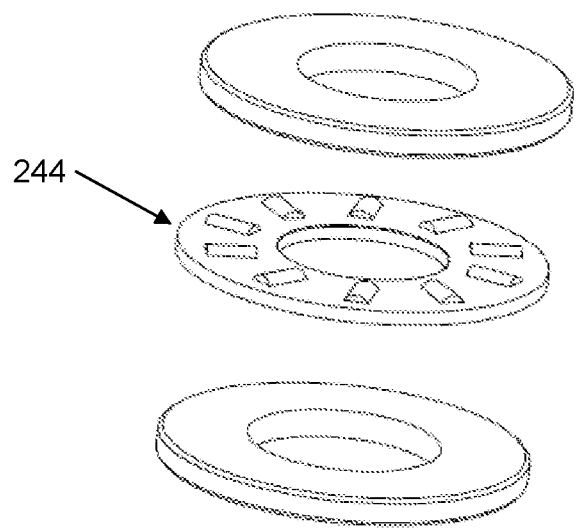
FIG. 3a and FIG. 3b illustrate structure diagrams of a plane bearing used in the electrical connection device according to an embodiment of the present invention.
Figure 3B:
Figure 5:
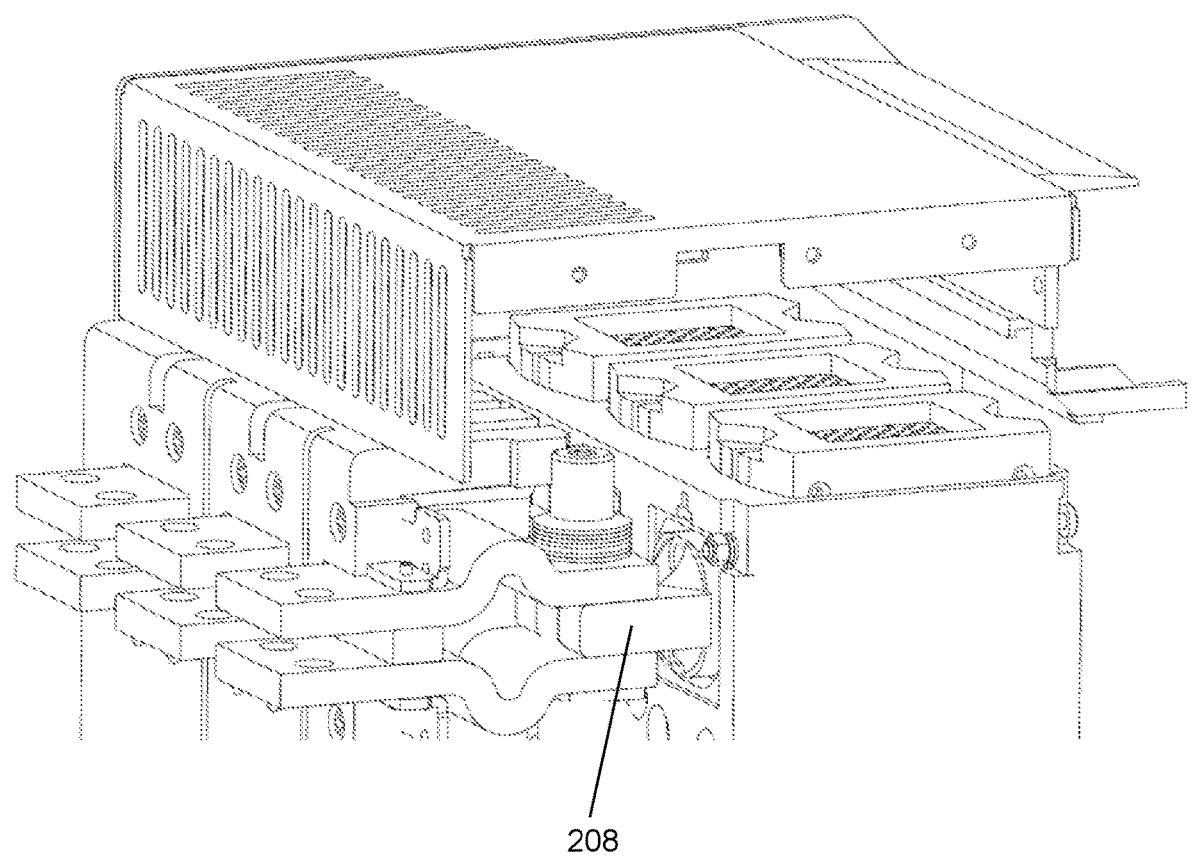
FIG. 5 illustrates a structural diagram of an electrical appliance with a draw-out structure using the electrical connection device according to an embodiment of the present invention.

Continue with FIG. 2a and FIG. 2b, the main body connection assembly 204 comprises: contact pieces 241, a clamping mechanism and a reset mechanism. There are two contact pieces 241, the two contact pieces 241 are close to and clamp the main body busbar 208 from both sides (as shown in FIG. 5). The contact pieces are connected with the flexible assembly. In the illustrated embodiment, the flexible assembly 206 is also provided as two pieces, and each contact piece 241 is connected with one piece of the flexible assembly 206 respectively. The clamping mechanism applies a clamping force from the outer side of the two contact pieces 241 so that the two contact pieces shrink inward to tightly contact and clamp the main body busbar 208. The reset mechanism applies a reset force from the inner side of the two contact pieces 241, so that the two contact pieces 241 expand outward to reset. In an embodiment, the clamping mechanism comprises: a fastener, a bearing member, an elastic member and a force applying member. The fastener is installed on the two contact pieces 241, the two contact pieces shrink inward when the fastener is tightened. The elastic member and the force applying member apply the clamping force to the two contact pieces 241. The bearing member is installed between the fastener and the elastic member, the bearing member absorbs a rotation caused by the action of the fastener, so that the rotation is not transmitted to the elastic member and the force applying member. In the embodiment shown in FIG. 2a and FIG. 2b, the fasteners are bolts 242 and nuts 243, the bearing member is a plane bearing 244, the elastic member is a disc spring assembly 245, and the force applying member is a pressure plate 246. The contact pieces 241 are provided with screw holes for the bolt 242 to pass through. The bolt 242 passes through the first contact piece (the upper contact piece) and the second contact piece (the lower contact piece) from the outer side (above) of the first contact piece, and the nut 243 is installed on the second end of the bolt from the outer side (below) of the second contact piece. In the first embodiment, the bolt 242 is a single-head bolt. The head of the bolt 242 is large, and the head is located outside the first contact piece. The shaft of the bolt 242 passes through the first contact piece and the second contact piece, and the nut 243 is tightened on the shaft of the bolt 242. A plane bearing 244, a disc spring assembly 245 and a pressure plate 246 are mounted between the first end (head) of the bolt 242 and the first contact piece (the upper contact piece). The disc spring assembly 245 includes a plurality of disc springs. The number of disc springs in the disc spring assembly 245 may be determined according to the required clamping force. The number of disc springs may be increased when a large clamping force is required, and a smaller number of disc springs may be used when only a small clamping force is required. In actual use, an appropriate number of disc springs will be configured to make a single electrical connection device generate a clamping force of more than 1500 N, and its effective clamping force is far greater than the 800 N clamping force generated by the electrical connection device in prior art. In order to evenly distribute the clamping force generated by the disc spring to the contact piece 241, a pressing plate 246 is used. The pressing plate 246 makes the clamping force evenly distributed to the contact pieces to clamp the main body busbar. The evenly distributed clamping force results a larger contact area between the contact piece and the main body busbar and a more stable contact. During the clamping operation, the bolt 242 and the nut 243 rotate relative to each other and shrink, the two contact pieces 241 shrink inward, the disc spring assembly 245 and the pressure plate 246 apply clamping force to the contact pieces 241 to clamp the main body busbar. On the one hand, the plane bearing 244 absorbs the relative rotation of the bolt and the nut, so that the above-mentioned rotation will not be transmitted to the disc spring and the pressure plate. On the other hand, the plane bearing 244 may rely on its own rotation to reduce the operation force for actuating the relative rotation of the bolt 242 and the nut 243. FIG. 3a and FIG. 3b illustrate structure diagrams of a plane bearing used in the electrical connection device according to an embodiment of the present invention. FIG. 3a illustrates an exploded structure diagram of the plane bearing, and FIG. 3b illustrates an assembled structure diagram of the plane bearing. In the illustrated embodiment, the plane bearing is realized by a roller plane bearing. In other embodiments, a ball plane bearing may also be used. Returning to the embodiment shown in FIG. 2a and FIG. 2b, the reset mechanism is a reset spring 247, and the reset spring 247 is mounted on the bolt 242. The reset spring 247 is located between the two contact pieces 241. During a clamping operation, the bolt and the nut rotate relative to each other and shrink, and the reset spring 247 is compressed. During a reset operation, the bolt and the nut rotate relative to each other and expand, the reset spring 247 is restored, and the reset spring 247 applies spring force to the inner side of the two contact pieces 241, causing the two contact pieces 241 to expand outward and restore. Under the action of the reset spring 247, after the bolt and the nut are loosened, the two contact pieces 241 may be restored to the original position with a larger distance, so that the main body busbar may be easily pulled out.

Figure 4:
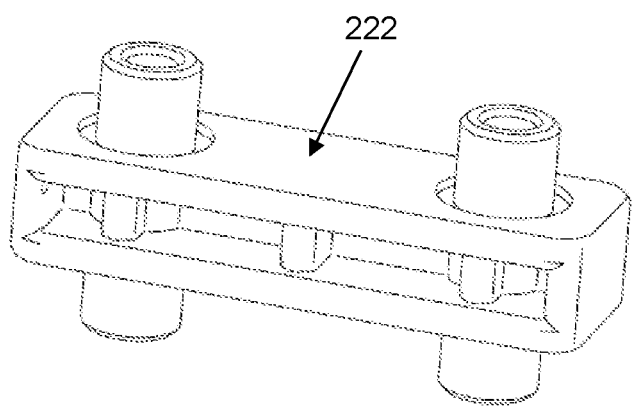
FIG. 4 illustrates a structure diagram of a backing plate used in the electrical connection device according to an embodiment of the present invention.

In the embodiment shown in FIG. 2a and FIG. 2b, the draw-out device connection assembly 202 includes connection pieces 221 and a heat dissipation mechanism. The connection pieces 221 are fixed on the draw-out device and are electrically connected to the inlet and outlet ends of the draw-out device. In the illustrated embodiment, there are two connection pieces 221, the two connection pieces 221 are arranged separately, and the two connection pieces 221 are connected to one piece of the flexible assembly 206 respectively. In other words, each contact piece 241 is connected to one piece of connection piece 221 through one piece of the flexible assembly 206, and there are two sets of the contact piece, the connection piece and the flexible assembly piece, an upper set and a lower set. The heat dissipation mechanism is installed on the connection pieces. In the illustrated embodiment, the heat dissipation structure includes a backing plate 222 and a fixing bracket 223. The backing plate 222 is provided with a hollow support structure, and the backing plate 222 is disposed between the two connection pieces 221. FIG. 4 illustrates a structure diagram of a backing plate used in the electrical connection device according to an embodiment of the present invention. The hollow support structure of the backing plate 222 facilitates heat dissipation. The two fixing brackets 223 fix the backing plate 222 from the outer side of the two connection pieces 221, and fix the backing plate 222 between the two connection pieces 221 to form an interval, so as to facilitate the installation of the busbar of the inlet or outlet end.

FIG. 5 illustrates a structural diagram of an electrical appliance with a draw-out structure using the electrical connection device according to an embodiment of the present invention. Electrical appliances with a draw-out structure may include: universal circuit breakers, molded case circuit breakers, automatic transfer switches with drawer devices, medium voltage circuit breakers, switch cabinets, etc. The electrical appliance with a draw-out structure includes a body and a draw-out device. The electrical connection device of the present invention is connected between the main body and the draw-out device of the electrical appliance with a draw-out structure. The draw-out device connection assembly is fixed on the draw-out device and is electrically connected with the inlet and outlet ends of the draw-out device. The clamping mechanism of the main body connection assembly makes the contact pieces close to and clamp the main body busbar 208.

Figure 6A:
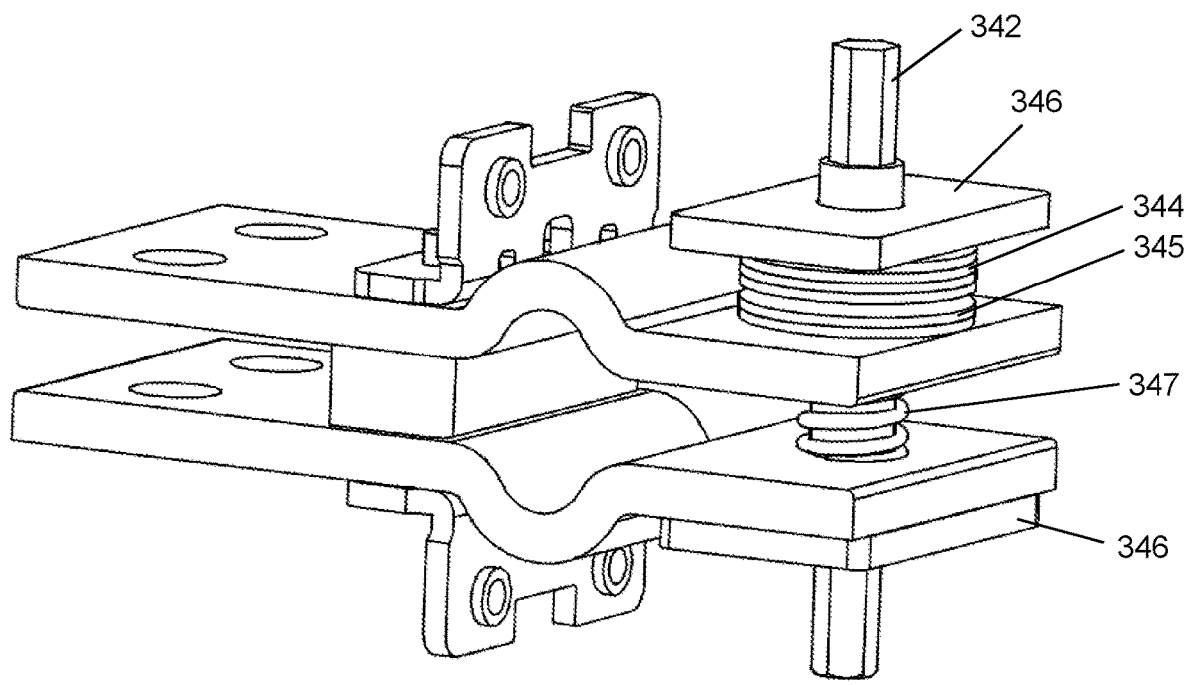
FIG. 6a and FIG. 6b illustrate structure diagrams of an electrical connection device according to a second embodiment of the present invention.
Figure 6B:
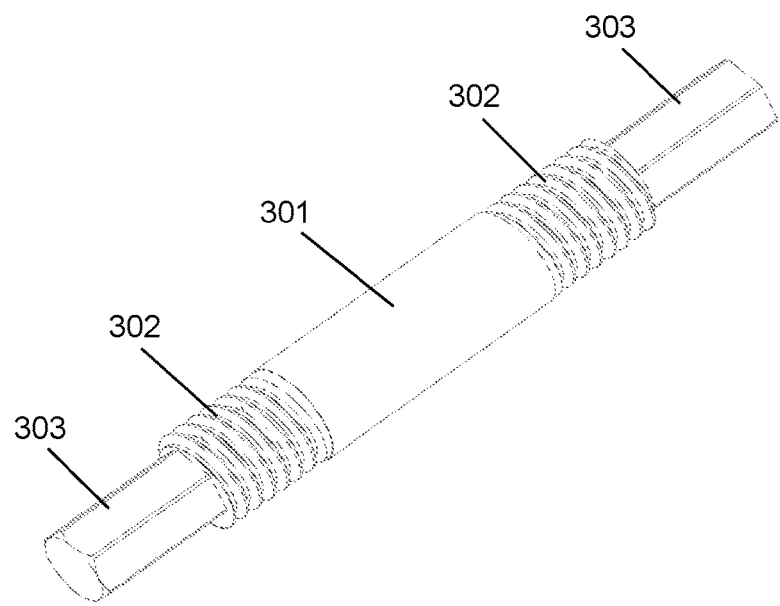

FIG. 6a and FIG. 6b illustrate structure diagrams of an electrical connection device according to a second embodiment of the present invention. The structure of the draw-out device connection assembly and the flexible assembly in the electrical connection device of the second embodiment is basically the same as that of the first embodiment. The structure of the contact pieces and the reset mechanism in the main body connection assembly is also basically the same as that of the first embodiment. The difference between the two embodiments is that the clamping mechanism is different. For the purpose of brevity, the draw-out device connection assembly, the flexible assembly, the contact pieces of the main body connection assembly and the reset mechanism in the electrical connection device of this embodiment will not be described again, contents about these assemblies may refer to the previous first embodiment. With reference to FIG. 6a, the clamping mechanism of the electrical connection device of this embodiment also functions to apply clamping force from the outer side of the two contact pieces, so that the two contact pieces shrink inward to close to and clamp the main body busbar. The clamping mechanism includes: a fastener, a bearing member, an elastic member and a force applying member. The fastener is installed on the two contact pieces, the two contact pieces shrink inward when the fastener is tightened. The elastic member and the force applying member apply clamping force to the two contact pieces. The bearing member is installed between the fastener and the elastic member, and the bearing member absorbs the rotation of the fastener when the fastener acts, so that the rotation is not transmitted to the elastic member and the force applying member. In the embodiment shown in FIG. 6a and FIG. 6b, the fastener is a stud bolt 342, the bearing member is a flat bearing 344, the elastic member is a disc spring assembly 345, and the force applying member is a pressure plate 346. FIG. 6b illustrates the structure of the stud bolt 342. The middle section of the stud bolt 342 is a connection part 301, two threaded areas 302 are positioned on both sides of the connection part. The threads in the two threaded areas 302 are opposite to each other. If one is defined as a forward thread, then the other is a reverse thread. On the outer sides of the threaded areas 302, receiving parts 303 are provided on each end of the stud bolt 342. Returning to FIG. 6a, screw holes are provided on the contact pieces for the stud bolt 342 to pass through. The stud bolt 342 passes through the first contact piece (the upper contact piece) and the second contact piece (the lower contact piece) sequentially from the outer side (above) of the first contact piece). The pressing plate 346 of the second embodiment is provided with threaded holes. Two pressing plates 346 are used to respectively fit the two threaded areas of the stud bolt 342. The upper pressing plate 346 is mounted on the upper threaded area, where the upper threaded area is defined as a forward thread. The lower pressing plate 346 is mounted on the lower threaded area, where the lower threaded area is defined as a reverse thread. The upper threaded area of the stud bolt 342 is positioned on the outer side of the first contact piece (above the first contact piece), while the lower threaded area of the stud bolt 342 is positioned on the outer side of the second contact piece (below the second contact piece). In this way, the two pressing plates 346 are positioned above the first contact piece and below the second contact piece respectively, and closely attached to the two contact pieces from the outer sides. On the stud bolt 342, a plane bearing 344 and a disc spring assembly 345 are installed between the upper pressing plate 346 and the first contact piece (the upper contact piece). The disc spring assembly 345 includes a plurality of disc springs. The number of disc springs in the disc spring assembly 345 may be determined according to the required clamping force. In this embodiment, the pressing plate 346 not only plays the role of evenly distributing the clamping force to the contact pieces, but also replaces the role of the nut in the first embodiment, which cooperates with the stud bolt 342 to tighten or loosen. The reset mechanism in this embodiment is still a reset spring 347, and the reset spring 347 is mounted on the stud bolt 342. The reset spring 347 is located between the two contact pieces. During the clamping operation, at least one of the two ends of the stud bolt 342 is rotated. Under the combined action of the forward and reverse threaded areas of the stud bolt, the upper and lower pressure plates 346 simultaneously shrink and act on the contact pieces, so that the contact pieces clamp the main body busbar. During the unscrewing operation, the upper and lower pressure plates simultaneously release the busbar as well. The stud bolts and the two pressing plates act simultaneously to clamp or loosen, which increases the operation speed, such as double the speed. It is beneficial to save the operation time and operation space of the draw-out device.

Figure 7A:
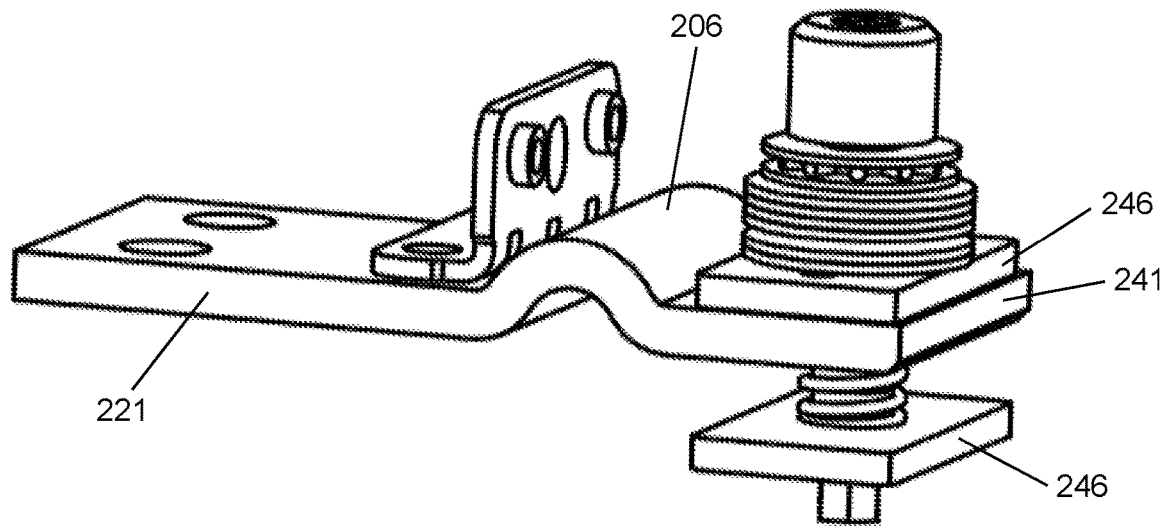
FIG. 7a and FIG. 7b illustrate structure diagrams of an electrical connection device according to a third embodiment of the present invention.
Figure 7B:
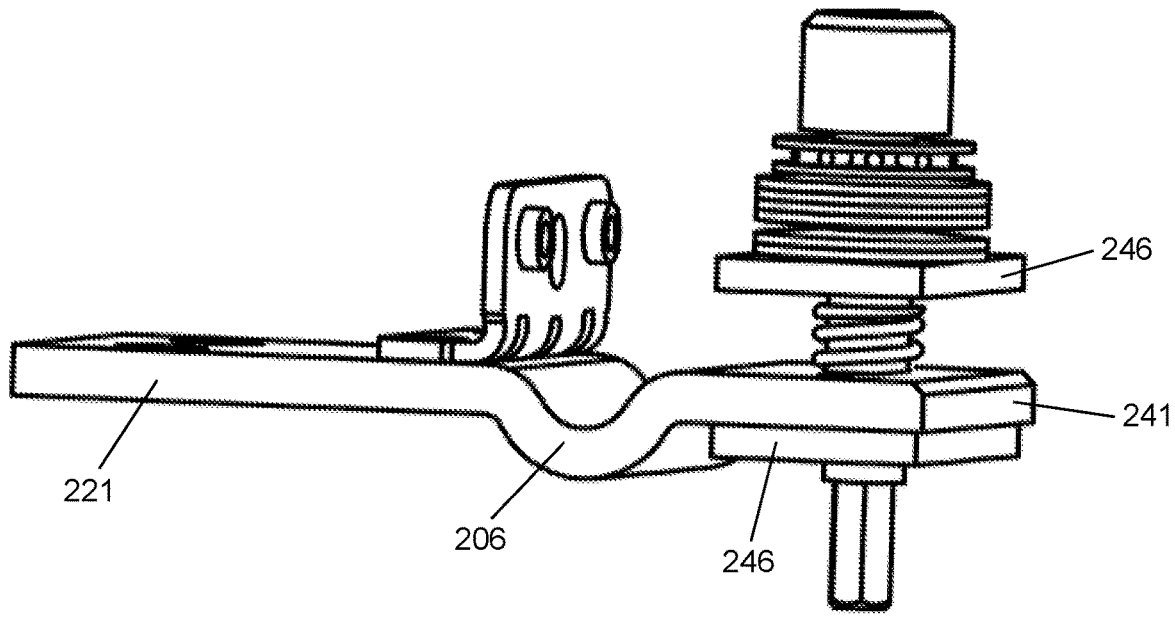

FIG. 7a and FIG. 7b illustrate structure diagrams of an electrical connection device according to a third embodiment of the present invention. The electrical connection device of the third embodiment may be regarded as a simplification of the electrical connection device of the first embodiment. In the third embodiment, the contact piece 241, the flexible assembly and the connection piece 221 are all provided as one piece. In the embodiment illustrated in FIG. 7a, the contact piece 241, the flexible assembly and the connection piece 221 of the upper side are retained, while the contact piece, the flexible assembly and the connection piece of the lower side are eliminated, and only one pressing plate 246 is retained. Under the action of the clamping mechanism, the upper contact piece and the lower pressing plate clamp the main body busbar together, and the upper contact piece is close to the main body busbar. In the embodiment illustrated in FIG. 7b, contrary to the embodiment of FIG. 7a, the contact piece 241, the flexible assembly and the connection piece 221 of the lower side are retained, while the contact piece, the flexible assembly and the connection piece of the upper side are eliminated, and only one pressing plate 246 is retained. Except that a single contact piece is used instead of two contact pieces, other assemblies in the electrical connection device of the third embodiment are similar to that in the electrical connection device of the first embodiment.

Figure 8:
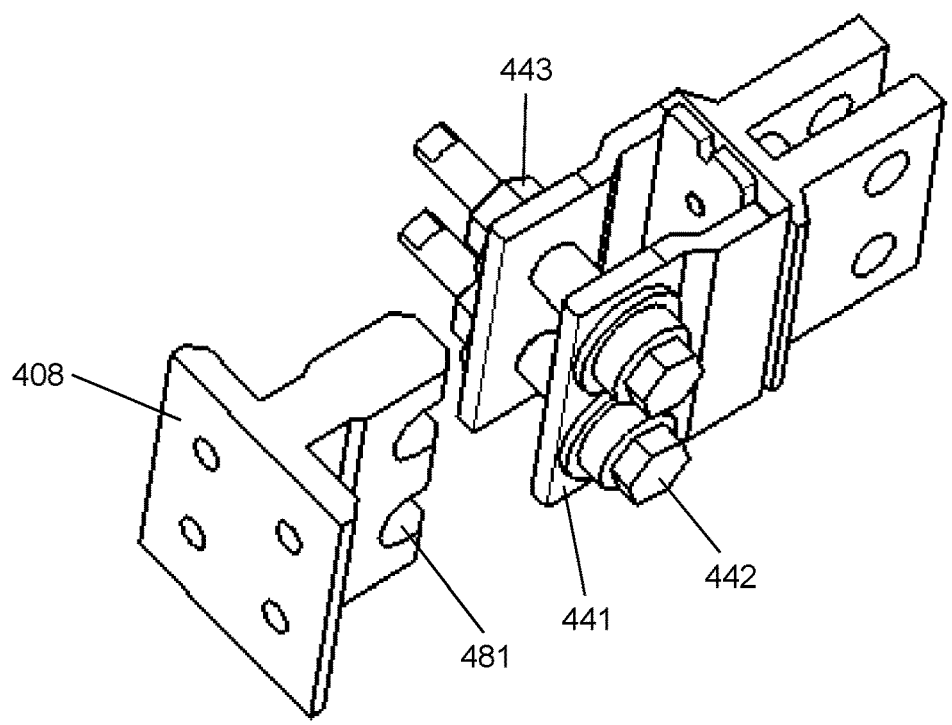
FIG. 8 and FIG. 9 illustrate structural diagrams of the modified embodiments of the electrical connection device of the present invention. The various modified embodiments are provided with main body connection assemblies with different structures to adapt to main body busbars with different structures.
Figure 9:
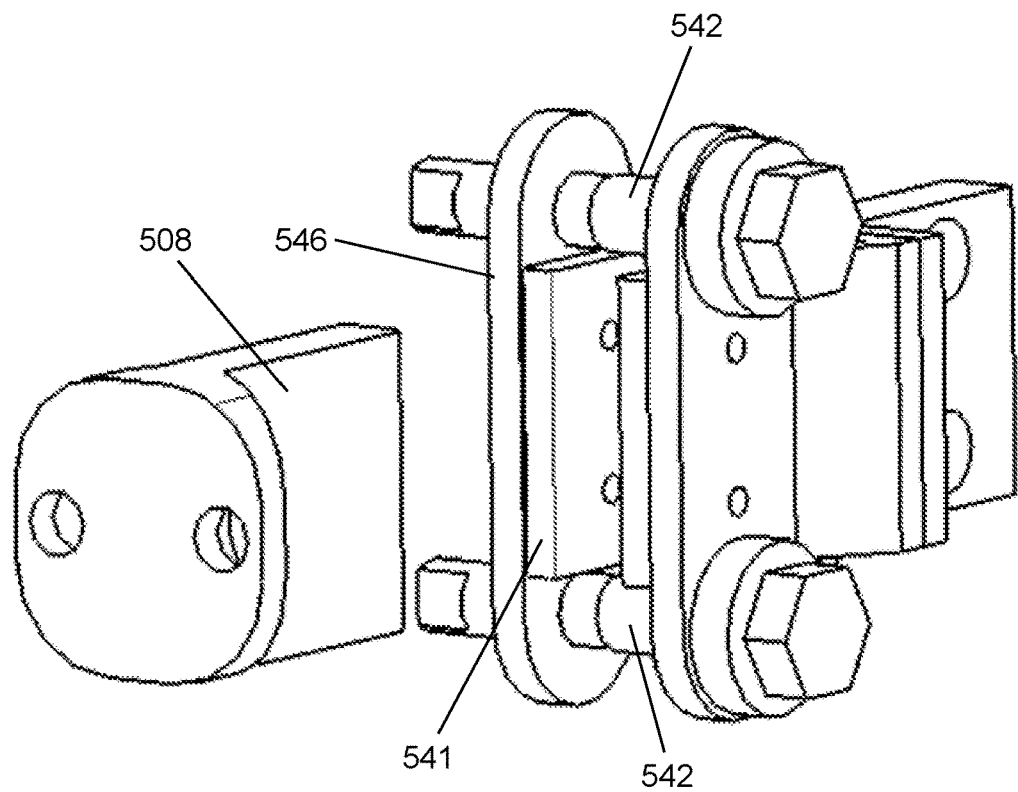

It is mentioned above that there are many types of electrical appliances with a draw-out structure, including: universal circuit breakers, molded case circuit breakers, automatic transfer switches with drawer devices, medium voltage circuit breakers, switch cabinets, etc. The main body busbars in different electrical devices may have different structures. In order to adapt to the main body busbars of different structures, the present invention also proposes various modifications. In the electrical connection devices of these modified embodiments, main body connection assemblies with different structures are provided, so as to adapt to the main body busbars with different structures. FIG. 8 and FIG. 9 illustrate structural diagrams of the modified embodiments of the electrical connection device of the present invention. It should be noted that, for the purpose of brevity, the descriptions and illustrations of the modified embodiments mainly focus on main body busbars with different structures and the main body connection assemblies that match them. For other universal structures, such as the draw-out device connection assembly, the flexible assembly and the same structures in the main body connection assembly, no redundant description will be provided in the specification. Details for these contents may refer to the foregoing description. Similarly, these universal structures are also simplified in the drawings. The illustrated the structures may be different from the corresponding components in the previous two embodiments, but it should be understood that this is just a simplification of expression. The structures of corresponding components illustrated in the foregoing embodiments may also be applied to these modified embodiments.

Referring to the modified embodiment shown in FIG. 8, in this modified embodiment, the main body busbar 408 has a wider size, and correspondingly, the contact piece 441 also has a wider size. When the contact piece 441 and the main body busbar 408 are wide, only a single set of bolt and nut cannot ensure that the clamping force can be effectively distributed to the entire contact piece and the main body busbar. Therefore, in the modified embodiment shown in FIG. 8, two sets of bolts 442 and nuts 443 are used on the contact piece 441. The two sets of bolts 442 and nuts 443 are arranged side by side, and the structures of each set of bolts and nuts and the corresponding bearing member, elastic member and force applying member are the same as those of the embodiment shown in FIG. 3a and FIG. 3b. Two screw holes are arranged side by side on the contact piece 441 for the two bolts 442 to pass through, and the two nuts 443 are screwed on the two bolts 442 respectively. Although not shown in the figure, the reset spring may still be mounted on the bolt in the modified embodiment shown in FIG. 8. In the embodiment shown in FIG. 8, there are two U-shaped grooves 481 on the main body busbar 408. The positions of the U-shaped grooves 481 correspond to the positions of the bolts 442. The U-shaped groove can play the role of guiding and positioning when the main body busbar is inserted into the contact pieces. It should be noted that in the description of the foregoing embodiment, although it is not mentioned whether a U-shaped groove is provided on the main body busbar, it is understandable that the U-shaped groove is a universal structure of the main body busbar. The same structure may be applied to the aforementioned embodiments. In the modified embodiment shown in FIG. 8, since two sets of bolts are used, two insulating transmission members are configured accordingly, and each insulating transmission member corresponds to one set of bolts.

Referring to the modified embodiment shown in FIG. 9, in this modified embodiment, the bolt no longer passes through the contact piece 541, but crosses over the contact piece 541 from the sides, and the pressing plate 546 is used to apply a clamping force to the contact piece 541. The clamping mechanism of the modified embodiment shown in FIG. 9 may include a fastener, a bearing member, an elastic member, and a force applying member. The fastener is a bolt and a nut, the bearing member is a plane bearing, the elastic member is a disc spring assembly, and the force applying member is a pressure plate. Referring to FIG. 9, the two pressing plates 546 are respectively attached to the outer sides of the two contact pieces 541 and fixed to the contact pieces 541 respectively. The pressure plate 546 has screw holes for bolts to pass through. The bolt 542 passes through the first pressure plate and the second pressure plate sequentially from the outer side of the first pressure plate, and the nut is mounted on the second end of the bolt from the outer side of the second pressure plate. In the modified embodiment shown in FIG. 9, the bolt only passes through the pressing plate but does not pass through the contact piece itself, and the bolt 542 crosses over the contact piece 541 from the sides of the contact piece. A plane bearing and a disc spring assembly are arranged between the first end of the bolt and the first pressure plate, and the disc spring assembly includes a plurality of disc springs. The bolt and the nut rotate relative to each other and shrink, the two pressure plates shrink inward, and the disc spring assembly applies clamping force to the contact pieces through the pressure plate. The plane bearing absorbs the relative rotation of the bolt and the nut, so that the disc spring and the pressure plate do not rotate. A reset spring may also be mounted on the bolt of the modified embodiment shown in FIG. 9. The reset spring is located between the two pressure plates. When the bolt and the nut rotate relative to each other and expand, the reset spring restores, and the reset spring applies spring force to the inner side of the two pressure plates. Then the two contact plates are spread out through the two pressing plates. In the embodiment shown in FIG. 9, since the bolt is moved to the outside of the contact piece, the U-shaped groove is no longer provided on the main body busbar 508. When the bolt does not pass through the contact piece, the main body busbar 508 may be inserted into a deeper position between the contact pieces (not blocked by the bolt). When the main body busbar is required to be inserted into the contact piece with more distance, or when the length of the main body busbar is longer, the structure of the modified embodiment shown in FIG. 9 may be used. Similar to the embodiment shown in FIG. 8, in the modified embodiment shown in FIG. 9, since two sets of bolts are used, two insulating transmission members are configured accordingly, and each insulating transmission member corresponds to one set of bolts.

There is an AC magnetic field in the working environment of the electrical connection device of the present invention. When a material with strong magnetic conductivity is positioned in the AC magnetic field, eddy currents will be induced inside. Especially in the case of forming a closed magnetic loop, internal eddy current loss of the material with strong magnetic conductivity is very large, resulting in very serious heat generation, which is also a safety hazard of electrical equipment. FIG. 10a, FIG. 10b and FIG. 10c illustrate principle diagrams of eliminating eddy current loss by the electrical connection device of the present invention. As shown in FIG. 10a, FIG. 10b and FIG. 10c, an alternating magnetic field loop B (i.e., AC magnetic field) is generated around the passing AC current I. If the draw-out device connection assembly and the main body connection assembly are all made of a material with strong magnetic conductivity, a vortex-shaped induced current i will form on the draw-out device connection assembly and the main body connection assembly under the action of the alternating magnetic field. The induced current i will generate a large eddy current loss, leading to severe heating. Therefore, in the case of a large current passing through, it is necessary to use non-magnetic material in at least one section of the magnetic loop to be generated, so as to prevent the formation of a closed magnetic loop, thereby avoiding or greatly reducing the induced current i generated by the power frequency AC current, and reducing eddy current loss and heat generation. Therefore, in the embodiment of the present invention, the draw-out device connection assembly and the main body connection assembly contain non-magnetic materials to prevent the formation of a closed magnetic loop. Non-magnetic materials may be used to form the backing plate, the fixing bracket, the pressing plate or other components.

Figure 11:
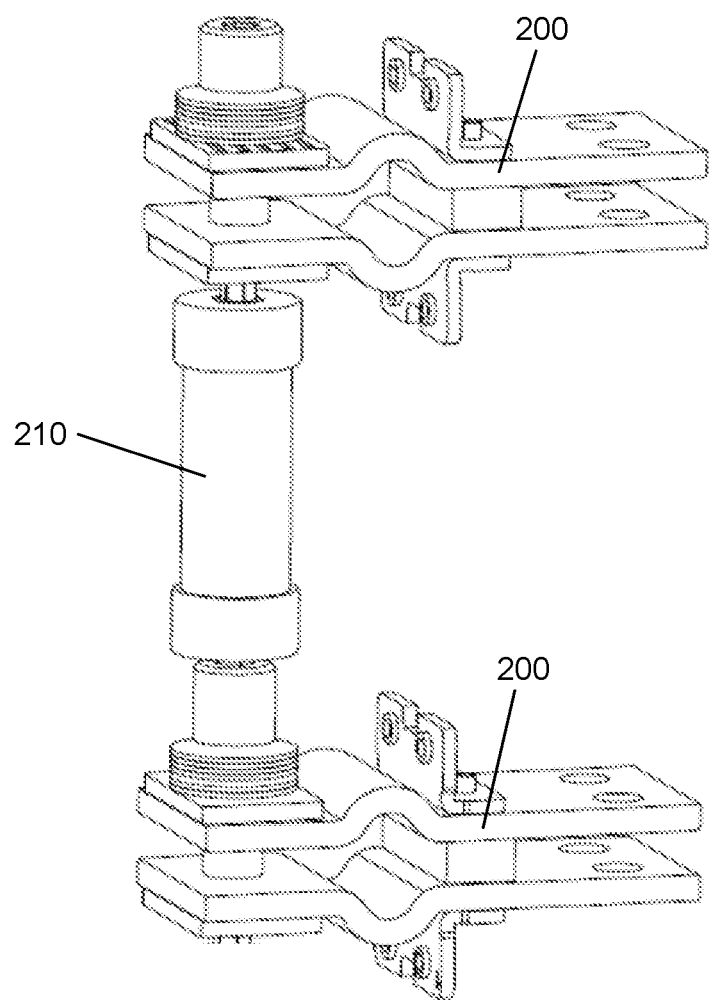
FIG. 11 illustrates a structural diagram of a linked electrical connection assembly according to an embodiment of the present invention. The linked electrical connection assembly is composed of the electrical connection device of the first embodiment.

Considering that in practical applications, circuit breakers or switch assemblies usually have two ends for inlet and outlet wires, so electrical connection devices are used in pairs. For the two electrical connection devices applied to the inlet and outlet ends of a same circuit, it is hoped that they can act in synchronization to clamp or loosen the main body busbars. Therefore, the present invention also provides a linked electrical connection assembly. FIG. 11 illustrates a structural diagram of a linked electrical connection assembly according to an embodiment of the present invention. As shown in the figure, the linked electrical connection assembly includes two electrical connection devices 200 and a linkage mechanism 210 connecting the two electrical connection devices. The two electrical connection devices 200 are respectively connected to the inlet and outlet ends of the electrical device. In this type of application, the linkage mechanism 210 is electrically insulated to ensure that no conductive path is formed between the two electrical connection devices so as to avoid short circuit fault. The linkage mechanism 210 must mechanically ensure that the two electrical connection devices operate in synchronization. In the embodiment of the linked electrical connection assembly shown in FIG. 11, the electrical connection device 200 is the electrical connection device of the first embodiment shown in FIG. 2a and FIG. 2b. The specific structure of the electrical connection device will not be repeated here.

Referring to the embodiment shown in FIG. 11, for the linked electrical connection assembly of the present invention, the linkage mechanism 210 is connected to the clamping mechanisms in the main body connection assemblies of the two electrical connection devices. The linkage mechanism 210 is insulated and makes the two electrical connection devices 200 be electrically insulated. The linkage mechanism 210 mechanically links the clamping mechanisms of the two electrical connection devices so that the two clamping mechanisms act in synchronization. The structure of the linkage mechanism 210 is compatible with the structure of the clamping mechanism of the electrical connection device. For the electrical connection device shown in FIG. 2a and FIG. 2b, the linkage mechanism 210 is an insulating transmission member, and the insulating transmission member connects the fasteners of the two electrical connection devices, so that the fasteners of the two electrical connection devices act in synchronization. For the electrical connection device shown in FIG. 2a and FIG. 2b, the fastener is a single-head bolt 242 and a nut 243, and the insulating transmission member 210 is mainly connected with two single-head bolts 242. Two ends of the insulating transmission member 210 have interfaces, and the two ends of the interfaces are respectively connected to the bolts 242 of the two electrical connection devices, so that the bolts 242 of the two electrical connection devices rotate in synchronization, thereby synchronously clamping or loosening the main body busbar. In this embodiment, because the bolt 242 is a single-head bolt, two ends of the bolt have different shapes. During assembly, the head of the bolt 242 of the upper electrical connection device in FIG. 11 is upward, while the head of the bolt 242 of the lower electrical connection device in FIG. 11 is downward, so that both ends of the insulating transmission member 210 are connected with the screw part of the bolt. The two ends of the insulating transmission part 210 may be provided with an interface matching the shape of the screw, and the screw part of the bolt is inserted into the interface to realize linkage. The shape of the screw and the interface is generally polygonal, such as a quadrilateral or a hexagon. The polygon can prevent the screw from slipping in the interface and reduce the loss of torque during the transmission process. In addition, in this embodiment, the disc spring, which functions as the elastic member, not only provides clamping force, but also absorbs the deviation of the clamping stroke of the two electrical connection devices. When the clamping operation is performed by one electrical connection device, the other electrical connection device is actuated at the same time through the linkage mechanism 210. Since the disc spring (the elastic member) has a compression stroke, the deviation of the stroke of the two electrical connection devices is absorbed by the elastic member. By arranging multiple disc springs, a larger compression stroke and clamping force may be achieved. In this embodiment, the clamping force of the two electrical connection devices may be maintained between 1500 N and 2000 N. Of course, a larger clamping force may also be generated by adding more disc springs.

Figure 12A:
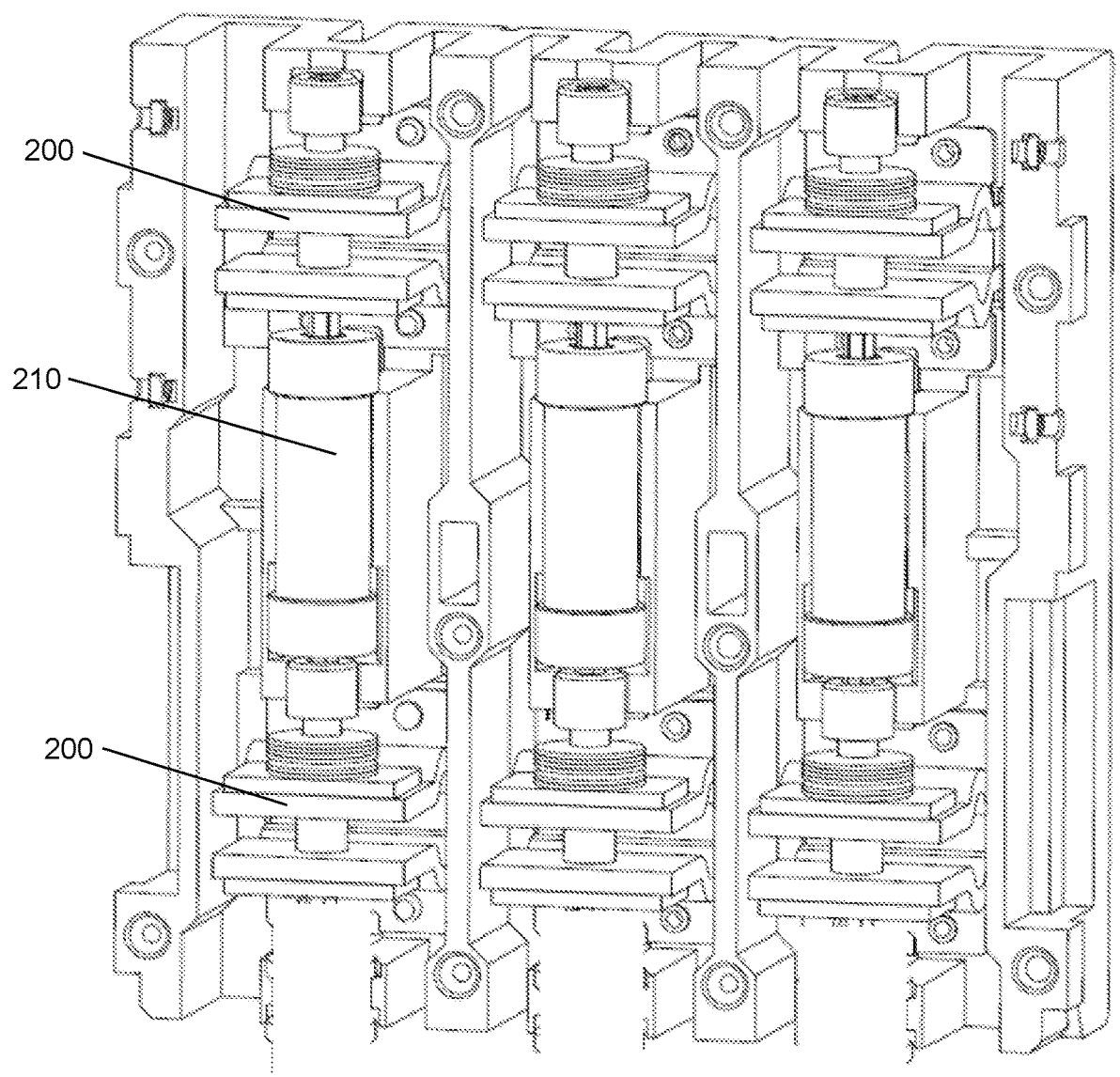
FIG. 12a and FIG. 12b illustrate using state diagrams of the linked electrical connection assembly according to an embodiment of the present invention.
Figure 12B:
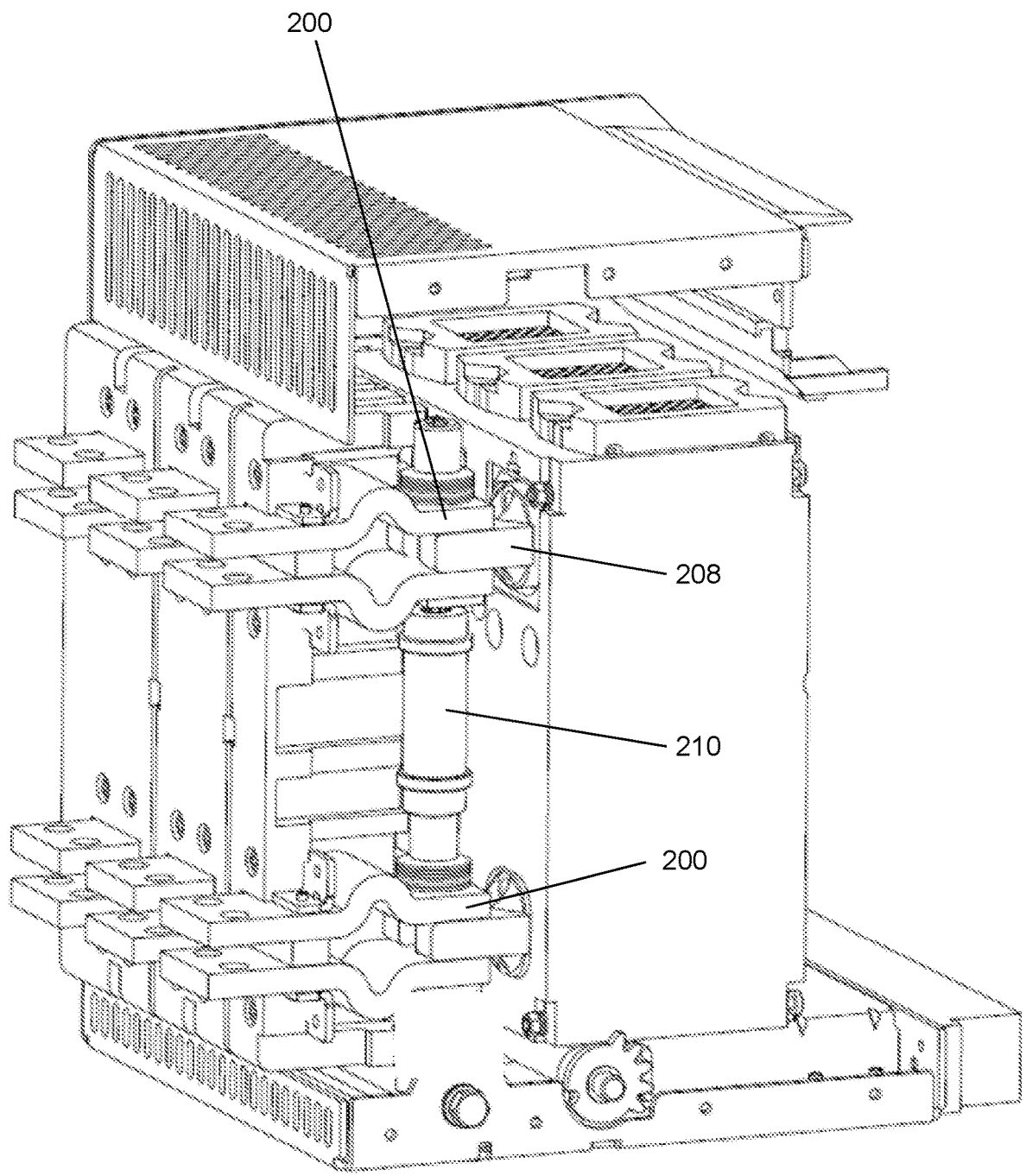

FIG. 12a and FIG. 12b illustrate using state diagrams of the linked electrical connection assembly according to an embodiment of the present invention. The electrical appliances with a draw-out structure include: universal circuit breakers, molded case circuit breakers, automatic transfer switches with drawer devices, medium voltage circuit breakers, switch cabinets, etc. The device with a draw-out structure includes a main body and a draw-out device. As described above, the circuit breaker or switch assembly usually has two ends for inlet and outlet wires, so the electrical connection devices are used in pairs. The linked electrical connection assembly of the present invention includes two electrical connection devices 200 and a linkage mechanism 210 connecting the two electrical connection devices. The two electrical connection devices 200 are respectively connected to the inlet and outlet ends of the same circuit. The electrical connection device is connected between the main body and the draw-out device of the electrical appliance with a draw-out structure. The draw-out device connection assembly is fixed on the draw-out device and is electrically connected with the inlet and outlet ends of the draw-out device. The clamping mechanism of the main body connection assembly makes the contact pieces close to and clamp the main body busbar 208. The linkage mechanism 210 connects the two electrical connection devices 200, and the linkage mechanism 210 enables the two electrical connection devices 200 to clamp or loosen the main body busbars of the inlet and outlet ends in synchronization.

In addition, the linkage mechanism 210 is insulated, which can prevent a short circuit between the electrical connection devices due to conduction.

The linked electrical connection assembly may also be constituted by the electrical connection device disclosed in other embodiments, for example, by the electrical connection device of the second embodiment illustrated in FIG. 6a and FIG. 6b. For the electrical connection device shown in FIG. 6a and FIG. 6b, the insulating transmission member 210 shown in FIG. 11 may still be used as a linkage mechanism. The head of the single-head bolt in the electrical connection device of the first embodiment shown in FIG. 2a and FIG. 2b is positioned in the outer side, and the screw part extends inward and is connected to the linkage mechanism 210. However, both ends of the stud bolt in the electrical connection device of the second embodiment shown in FIG. 6a and FIG. 6b are screw structures. The component connected to the linkage mechanism in the second embodiment is also a screw structure, which is the same as the previous embodiment. Similarly, both ends of the insulating transmission member 210 used in this embodiment are connected with the screw part of the bolt. The two ends of the insulating transmission member 210 may be provided with an interface matching the shape of the screw, and the screw part of the bolt is inserted into the interface to realize linkage. The shape of the screw and the interface is generally polygonal, such as a quadrilateral or a hexagon. The polygon may prevent the screw from slipping in the interface and reduce the loss of torque during the transmission process.

Figure 13:
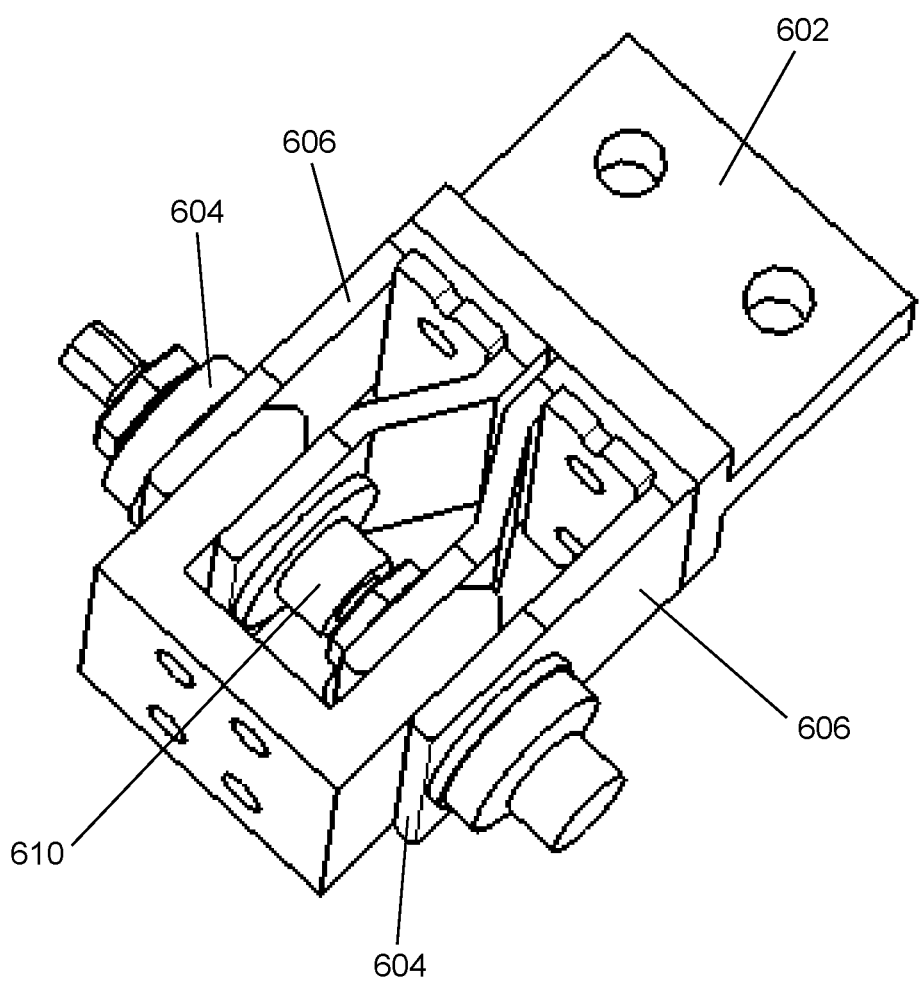
FIG. 13 illustrates a structural diagram of a linked electrical connection assembly according to another embodiment of the present invention.

Electrical appliances such as circuit breakers and switch cabinets will be configured in a multi-phase form in actual applications, and multi-phase wiring needs to be set at the inlet and outlet ends of the electrical appliances. For multi-phase configurations, the present invention also proposes a linked electrical connection assembly. FIG. 13 illustrates a structural diagram of a linked electrical connection assembly according to another embodiment of the present invention. Referring to FIG. 13, the linked electrical connection assembly includes an electrical connection device and a linkage mechanism. The electrical connection device is connected between the main body and the draw-out device of the electrical appliance with a draw-out structure. The electrical appliance has multiple phases, and the electrical connection device includes: a draw-out device connection assembly 602, a number of main body connection assemblies 604, and a flexible assembly 606. The draw-out device connection assembly 602 is fixed on the draw-out device and is electrically connected to the inlet and outlet ends of the draw-out device. Each main body connection assembly 604 corresponds to one of the phases of the electrical appliance. Each main body connection assembly 604 includes contact pieces with a clamping mechanism. The clamping mechanism makes the contact pieces close to and clamp the main body busbar of the corresponding phase. The flexible assembly 606 connects the draw-out device connection assembly 602 and the main body connection assembly 604, and the main body connection assembly 604, the flexible assembly 606 and the draw-out device connection assembly 602 form a conductive path. In the illustrated embodiment, in order to cooperate with several main body connection assemblies 604, a number of flexible assemblies 606 are correspondingly configured, and each flexible assembly 606 corresponds to one main body connection assembly 604. The contact pieces of each main body connecting assembly 604 are offset by adapting to the position deviation of the corresponding main body busbar, so that the contact pieces close and clamp the body busbar. The flexible assembly 606 absorbs the deviation of the contact pieces with its own deformation, so that the offset is not transmitted to the draw-out device connection assembly 602. In the embodiment shown in FIG. 13, each main body connection assembly includes contact pieces, a clamping mechanism and a reset mechanism. The clamping mechanism is a single-head bolt and nut. The structure of the main body connection assembly is the same as that of the first embodiment shown in FIG. 2*a* and FIG. 2*b*. The linkage mechanism 610 connects the clamping mechanisms of the several main body connection assemblies, and the linkage mechanism enables the clamping mechanisms of the several main body connection assemblies to operate in synchronization. In this embodiment, since each main body connection assembly is one of the multi-phase ends of a same terminal, there is no requirement for insulation between each other, and the linkage mechanism 610 does not require insulation. In the embodiment shown in FIG. 13, the linkage mechanism 610 may be implemented in one of the following ways: using a single-head bolt with a longer screw, and the screw passing through and connecting two main body connection assemblies, and realizing the linkage by the screw. Or adding a transmission member between the two single-head bolts, the structure of the transmission member may be similar to the insulating transmission member in the foregoing embodiment. This transmission member has no insulation requirement, it may be implemented as conductive or insulated. Since the main function of the transmission member is mechanical linkage, it is also advisable to set it as insulated, so as to prevent the screw part from being accidentally short circuit caused by electric conduction.

Figure 14:
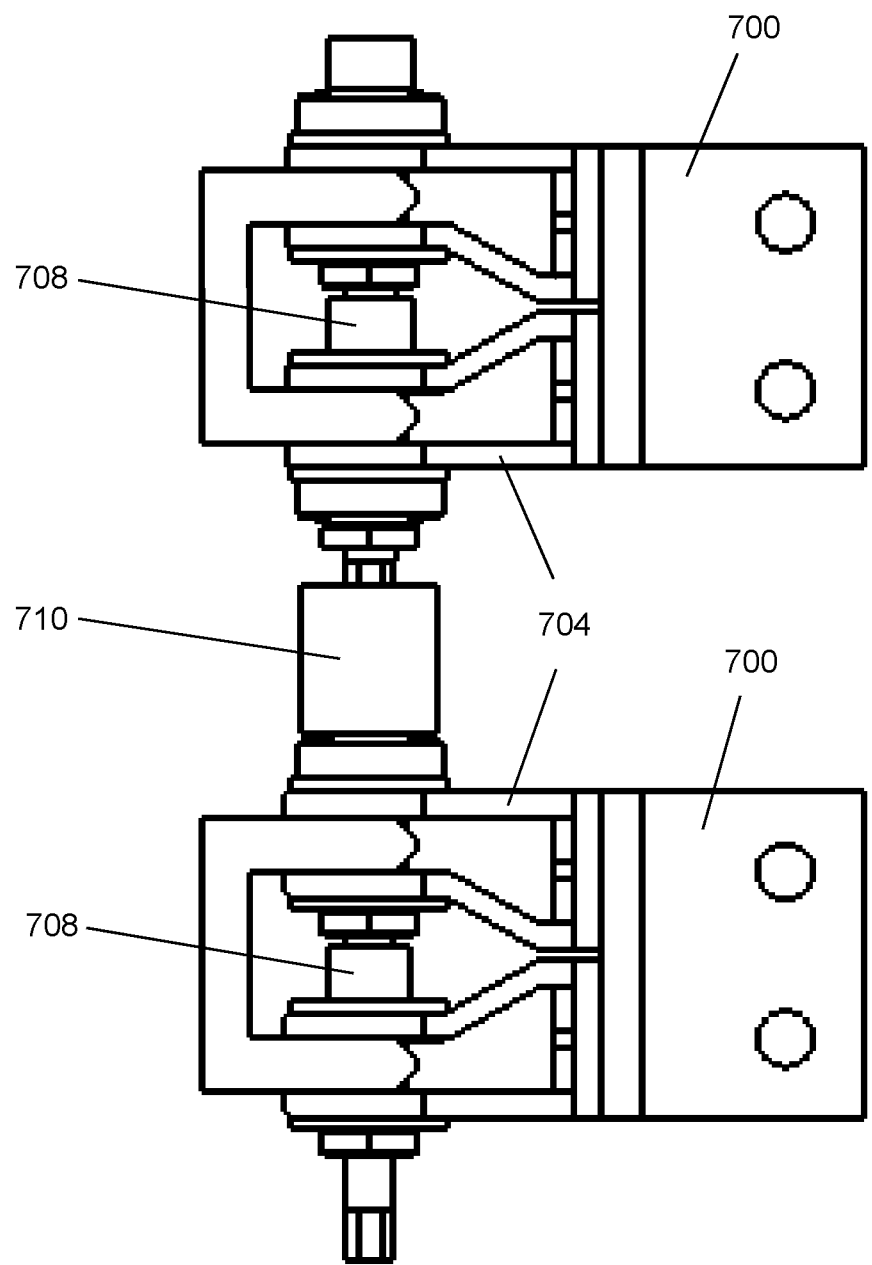
FIG. 14 illustrates a structural diagram of a linked electrical connection assembly according to another embodiment of the present invention.

FIG. 14 illustrates a structural diagram of a linked electrical connection assembly according to another embodiment of the present invention. The embodiment shown in FIG. 14 may be regarded as a combination of the embodiments of FIG. 11 and FIG. 13. In the embodiment shown in FIG. 14, the linked electrical connection assembly includes two electrical connection devices 700 and a linkage mechanism 710 that connects the two electrical connection devices. The two electrical connection devices 700 are respectively connected to the inlet and outlet ends of the electrical device. Each electrical connection device 700 itself is a multi-phase electrical connection device, and is provided with a plurality of main body connection assemblies 704 to correspond to a multi-phase configuration. Inside each electrical connection device, a linkage mechanism 708 is also provided between several main body connection assemblies 704. In the embodiment shown in FIG. 14, the linkage mechanism 710 is a linkage mechanism between the inlet end and the outlet end, which requires insulation and needs to be implemented by an insulating transmission member 210 similar to the embodiment shown in FIG. 11. The linkage mechanism 708 is a linkage mechanism between multiple phases of a same terminal, and there is no insulation requirement. It can be implemented by the linkage mechanism 610 in the embodiment shown in FIG. 13, which may be insulated or not.

Figure 15A:
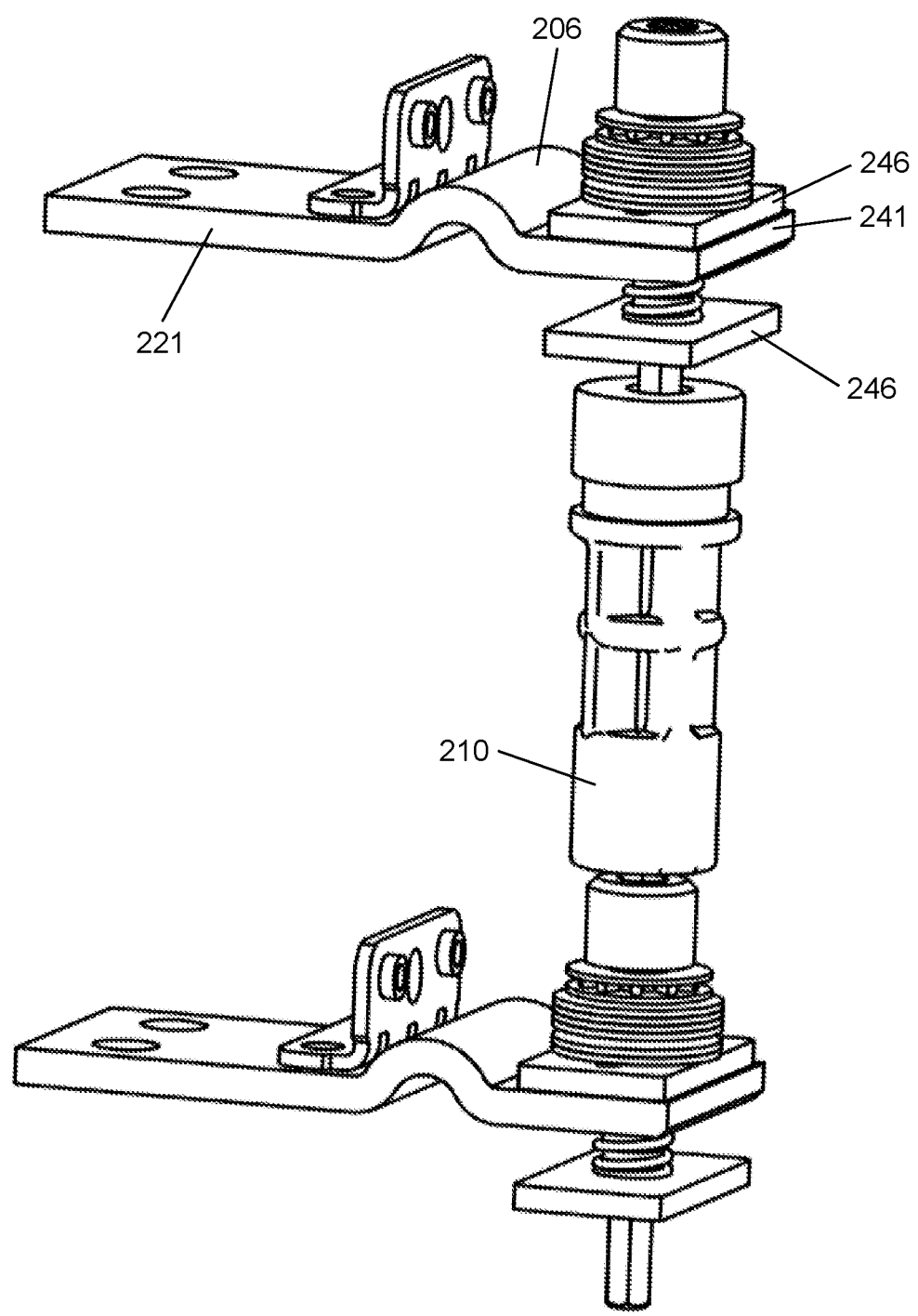
FIG. 15a and FIG. 15b illustrate structural diagrams of a linked electrical connection assembly according to another embodiment of the present invention.
Figure 15B:
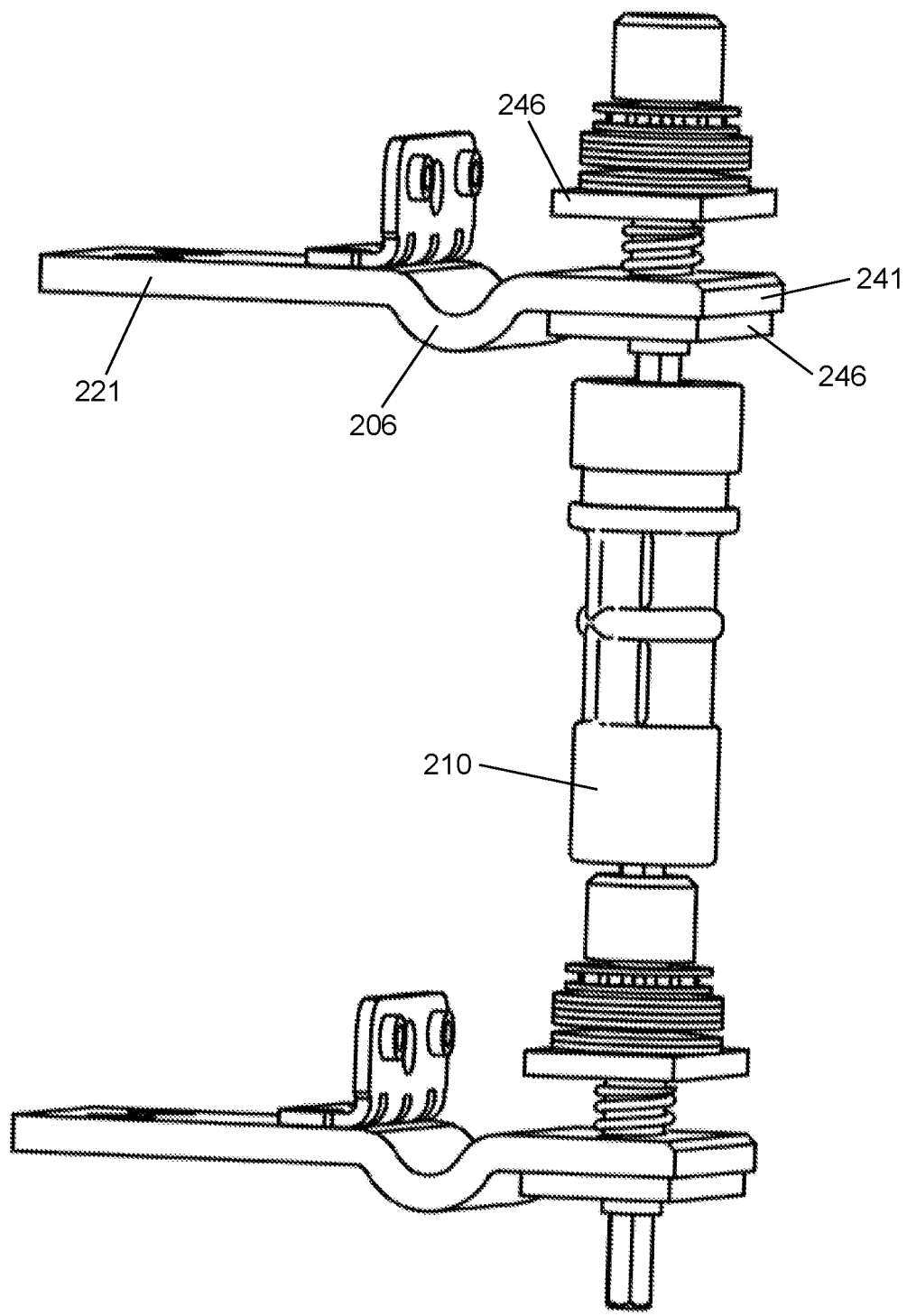

FIG. 15*a* and FIG. 15*b* illustrate structural diagrams of a linked electrical connection assembly according to another embodiment of the present invention. The linked electrical connection assembly shown in FIG. 15*a* and FIG. 15*b* may be considered as a simplification of the linked electrical connection assembly shown in FIG. 11. In the embodiment shown in FIG. 15*a* and FIG. 15*b*, the two electrical connection devices connected by the insulating transmission member 210 are both provided with only one piece of the contact piece 241, the flexible assembly 206 and the connection piece 221. In the example shown in FIG. 15*a*, both electrical connection devices retain the contact piece 241, the flexible assembly 206, and the connection piece 221 on the upper side, while the contact piece, the flexible assembly, and connection on the lower side are eliminated and only one pressing plate 246 is retained. Under the action of the clamping mechanism, the upper contact piece and the lower pressing plate clamp the main body busbar together, and the upper contact piece is close to the main body busbar. In the example shown in FIG. 15*b*, which is the opposite to that of FIG. 15*a*, both electrical connection devices retain the contact piece 241, the flexible assembly 206, and the connection piece 221 on the lower side, while the contact piece, the flexible assembly, and connection on the upper side are eliminated and only one pressing plate 246 is retained. Except that a single contact piece is used instead of two contact pieces, other components in the linked electrical connection assembly of this embodiment is similar to that of the linked electrical connection assembly of the embodiment shown in FIG. 11.

Figure 16A:
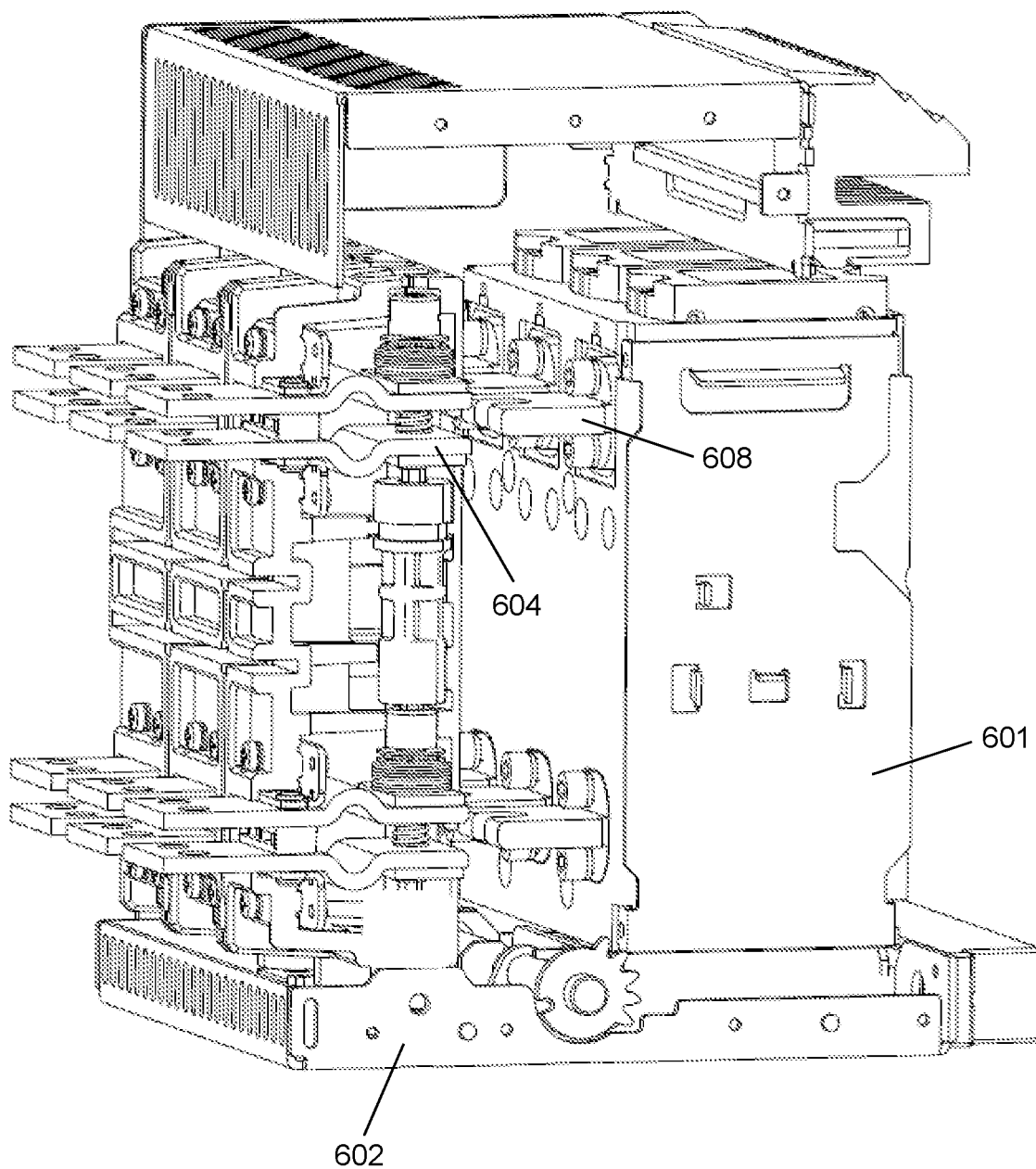
FIG. 16a and FIG. 16b illustrate schematic diagrams of the separation position and the insertion position of an electrical appliance with a draw-out structure which is adapted to the linkage electrical connection assembly of the present invention.
Figure 16B:
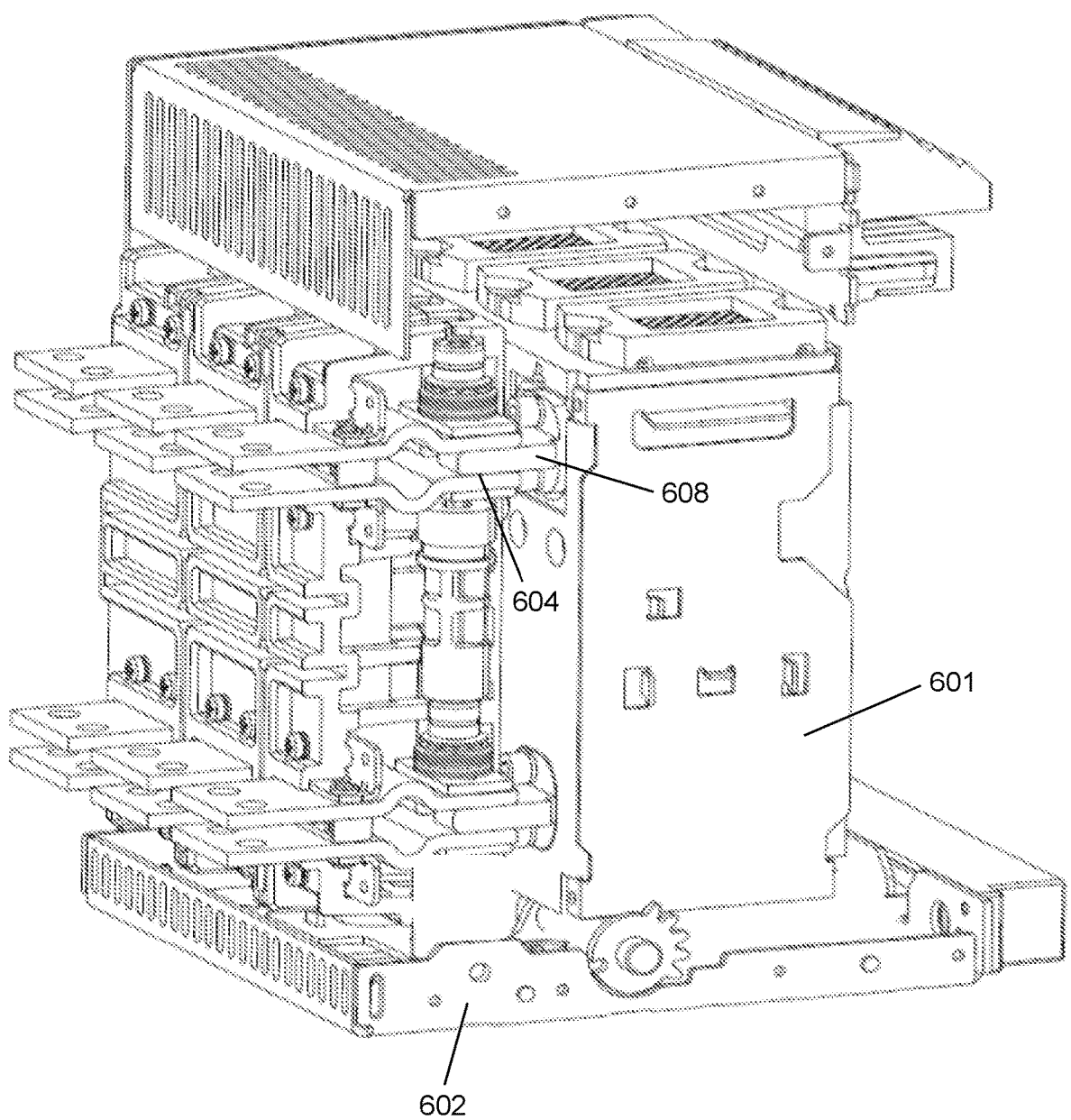

An important function of the linked electrical connection assembly of the present invention is to resolve the contradiction between insertion and clamping operations. Therefore, the main body and the draw-out device of the electrical appliance with a draw-out structure which is adapted to the linkage electrical connection assembly of the present invention have two connection states: a separation state and an insertion state. FIG. 16*a* and FIG. 16*b* illustrate schematic diagrams of the separation position and the insertion position of an electrical appliance with a draw-out structure which is adapted to the linkage electrical connection assembly of the present invention. As shown in the figure, the main body 601 and the draw-out device 602 of the electrical appliance with a draw-out structure have a separation position and an insertion position. Referring to FIG. 16*a*, in the separation position, the main body 601 exits the draw-out device 602, the main body busbar 608 is separated from the main body connection assembly 604, and the main body busbar does not contact the contact pieces. Referring to FIG. 16*b*, in the insertion position, the main body 601 is pushed into the draw-out device 602, the main body busbar 608 is inserted into the main body connection assembly 604, and then the clamping mechanism makes the contact pieces to close and clamp the body busbar.

The electrical connection device of the present invention structurally solves the contradiction between insertion and clamping operations. The clamping operation may be performed after the main body busbar is inserted into the contact pieces, and sufficient clamping force may be applied to ensure contact. The clamping force will not affect the assembly of the main body busbar. In addition, the electrical connection device is provided with a flexible assembly, which can absorb a certain deviation through its own deformation, so that the contact piece may follow the position deviation of the main body busbar to generate a certain deviation itself, so as to fully adhere to the main body busbar and ensure sufficient contact area and contact stability. The linkage mechanism connects the clamping mechanisms of the two electrical connection devices. The two electrical connection devices are usually connected to the inlet end and the outlet end respectively. The linkage mechanism enables multiple sets of electrical connection devices to clamp their respective main body busbars in synchronization, which simplifies the operation mode.

According to the present invention, when the main body busbar is inserted into the electrical connection device, it can be realized that there is no mutual force between the main body busbar and the electrical connection device, such as the expansion force of the contact pieces and the friction force between the main body and the contact pieces. A driving device of the draw-out device may push the main body of the electrical appliance with a very small force, and make the main body bus bar be inserted into the electrical connection device.

The electrical connection device may be configured with a large clamping force to clamp the main body bus bar according to the requirements, so that the overall contact resistance of the electrical appliance is greatly reduced. The power consumption is greatly reduced especially in the long-term use, and the cost is greatly saved. The higher the rated current is, the more significant this advantage will be. On the other hand, the reduction in contact resistance reduces the temperature rise of the product and the heat generation of the electrical device. There is no need to consider a large heat dissipation space, which is effective in reducing the size of the product and improving the reliability of long-term use.

In addition to providing greater clamping force, the presence of the elastic member also absorbs the deviation of the clamping stroke between the two electrical connection devices, so that the difference in the clamping force of the two electrical connection devices after synchronous action is very small, and both maintain a large clamping force.

The above embodiments are provided to those skilled in the art to realize or use the invention, under the condition that various modifications or changes being made by those skilled in the art without departing the spirit and principle of the invention, the above embodiments may be modified and changed variously, therefore the protection scope of the invention is not limited by the above embodiments, rather, it should conform to the maximum scope of the innovative features mentioned in the Claims.

What is claimed is:

1. An electrical connection device, configured to be connected between a main body and a draw-out device of an electrical appliance with a draw-out structure, wherein the electrical connection device comprises:
   a draw-out device connection assembly, including connection pieces being fixed on the draw-out device and electrically connected to inlet and outlet ends of the draw-out device;
   a main body connection assembly, including contact pieces with a clamping mechanism, the clamping mechanism making the contact pieces close to and clamp a main body busbar;
   a flexible assembly, connecting the connection pieces of the draw-out device connection assembly and the contact pieces of the main body connection assembly, the main body connection assembly, the flexible assembly and the draw-out device connection assembly forming a conductive path;
   wherein the contact pieces of the main body connection assembly are offset by adapting to a position deviation of the main body busbar, so that the contact pieces close to and clamp the main body busbar, and the flexible assembly absorbs the offset of the contact pieces by deformation of the flexible assembly, the offset is not transferred to the draw-out device connection assembly;
   wherein the main body connection assembly comprises:
   the contact pieces, closing to and clamping the main body busbar, and being connected to the flexible assembly;
   the clamping mechanism, applying a clamping force from an outer side of the contact pieces, so that the contact pieces shrink inward so as to tightly close to and clamp the main body busbar;
   a reset mechanism, applying a reset force from an inner side of the contact pieces, so that the contact pieces expand outward to reset;
   wherein the clamping mechanism comprises: a fastener, a bearing member, an elastic member and a force applying member;
   the fastener is installed on the contact pieces, the contact pieces shrink inward when the fastener is tightened;
   the elastic member and the force applying member apply the clamping force to the contact pieces;
   the bearing member is installed between the fastener and the elastic member, the bearing member absorbs a rotation caused by an action of the fastener, so that the rotation is not transmitted to the elastic member and the force applying member;
   wherein there are two contact pieces, the two contact pieces are close to and clamp the main body busbar from both sides, the fastener is installed on the two contact pieces, and the two contact pieces shrink inward when the fastener is tightened, the reset mechanism is installed on the inner side of the two contact pieces, and the reset mechanism makes the two contact pieces expand outward to reset;
   wherein
   the fastener includes a bolt and a nut, the bearing member is a plane bearing, the elastic member is a disc spring assembly, and the force applying member is a pressure plate;
   screw holes are provided on the contact pieces for the bolt to pass through, the bolt passes through a first contact piece and a second contact piece sequentially from the outer side of the first contact piece, and the nut is mounted on a second end of the bolt from the outer side of the second contact piece;
   the plane bearing, the disc spring assembly and the pressure plate are installed between a first end of the bolt and the first contact piece, and the disc spring assembly includes a plurality of disc springs;
   when the bolt and the nut rotate relative to each other and shrink, the two contact pieces shrink inward, and the disc spring assembly and the pressure plate apply clamping force to the contact pieces;
   the plane bearing absorbs the relative rotation of the bolt and the nut, so that the disc springs and the pressure plate do not rotate.

2. The electrical connection device according to claim 1, wherein the reset mechanism is a reset spring, the reset spring is mounted on the bolt, and the reset spring is positioned between the two contact pieces or the two pressure plates, when the bolt and the nut rotate relative to each other and shrink, the reset spring is compressed, when the bolt and the nut rotate relative to each other and expand, the reset spring restores, the reset spring applies spring force to inner sides of the two contact pieces or the two pressure plates, causing the two contact pieces to expand outward.

3. The electrical connection device according to claim 1, wherein the flexible assembly is formed by a multilayer copper foil, a multilayer copper tape or a copper braided wire.

4. The electrical connection device according to claim 1, wherein the draw-out device connection assembly further comprises:

a heat dissipation mechanism, being installed on the connection pieces.

5. The electrical connection device according to claim 4, wherein there are two connection pieces, and the two connection pieces are arranged separately, the heat dissipation mechanism comprises:
   a backing plate with a hollow support structure, the backing plate being arranged between two connection pieces;
   a fixing bracket, fixing the backing plate from outer sides of the two connection pieces.

6. The electrical connection device according to claim 1, wherein the draw-out device connection assembly and the main body connection assembly comprise non-magnetic materials to prevent the formation of a closed magnetic loop.

7. An electrical appliance with a draw-out structure, comprising a main body and a draw-out device, wherein the main body and the draw-out device have a separation position and an insertion position, wherein the main body and the draw-out device are connected by the electrical connection device as claimed in claim 1, wherein,
   in the separation position, the main body exits the draw-out device, the main body busbar is separated from the main body connection assembly, and the main body busbar does not contact with the contact pieces;
   in the insertion position, the main body is pushed into the draw-out device, the main body busbar is inserted into the main body connection assembly, and the contact pieces close to and clamp the main body busbar.

8. An electrical connection device, configured to be connected between a main body and a draw-out device of an electrical appliance with a draw-out structure, wherein the electrical connection device comprises:
   a draw-out device connection assembly, including connection pieces being fixed on the draw-out device and electrically connected to inlet and outlet ends of the draw-out device;
   a main body connection assembly, including contact pieces with a clamping mechanism, the clamping mechanism making the contact pieces close to and clamp a main body busbar;
   a flexible assembly, connecting the connection pieces of the draw-out device connection assembly and the contact pieces of the main body connection assembly, the main body connection assembly, the flexible assembly and the draw-out device connection assembly forming a conductive path;
   wherein the contact pieces of the main body connection assembly are offset by adapting to a position deviation of the main body busbar, so that the contact pieces close to and clamp the main body busbar, and the flexible assembly absorbs the offset of the contact pieces by deformation of the flexible assembly, the offset is not transferred to the draw-out device connection assembly;
   wherein the main body connection assembly comprises:
   the contact pieces, closing to and clamping the main body busbar, and being connected to the flexible assembly;
   the clamping mechanism, applying a clamping force from an outer side of the contact pieces, so that the contact pieces shrink inward so as to tightly close to and clamp the main body busbar;
   a reset mechanism, applying a reset force from an inner side of the contact pieces, so that the contact pieces expand outward to reset;
   wherein the clamping mechanism comprises: a fastener, a bearing member, an elastic member and a force applying member;
   the fastener is installed on the contact pieces, the contact pieces shrink inward when the fastener is tightened;
   the elastic member and the force applying member apply the clamping force to the contact pieces;
   the bearing member is installed between the fastener and the elastic member, the bearing member absorbs a rotation caused by an action of the fastener, so that the rotation is not transmitted to the elastic member and the force applying member;
   wherein there are two contact pieces, the two contact pieces are close to and clamp the main body busbar from both sides, the fastener is installed on the two contact pieces, and the two contact pieces shrink inward when the fastener is tightened, the reset mechanism is installed on the inner side of the two contact pieces, and the reset mechanism makes the two contact pieces expand outward to reset;
   wherein
   the fastener includes a bolt and a nut, the bearing member is a plane bearing, the elastic member is a disc spring assembly, and the force applying member are pressure plates;
   two pressure plates are respectively attached to outer sides of the two contact pieces and are respectively fixed with the two contact pieces, screw holes are provided on the pressure plates for the bolt to pass through, the bolt passes through a first pressure plate and a second pressure plate sequentially from the outer side of the first pressure plate, and the nut is mounted on a second end of the bolt from the outer side of the second pressure plate;
   the plane bearing and the disc spring assembly are installed between a first end of the bolt and the first contact piece, and the disc spring assembly includes a plurality of disc springs;
   when the bolt and the nut rotate relative to each other and shrink, the two pressure pieces shrink inward, and the disc spring assembly applies clamping force to the contact pieces through the pressure plates;
   the plane bearing absorbs the relative rotation of the bolt and the nut, so that the disc springs and the pressure plate do not rotate.

9. A linked electrical connection assembly includes two electrical connection devices and a linkage mechanism connecting the two electrical connection devices, wherein,
   the two electrical connection devices are connected between a main body and a draw-out device of an electrical appliance with a draw-out structure, the two electrical connection devices are respectively connected to an inlet end and an outlet end of the electrical appliance, the electrical connection device comprises:
   a draw-out device connection assembly, including connection pieces being fixed on the draw-out device and electrically connected to the inlet and outlet ends of the draw-out device;
   a main body connection assembly, including contact pieces with a clamping mechanism, the clamping mechanism making the contact pieces close to and clamp a main body busbar;
   a flexible assembly, connecting the connection pieces of the draw-out device connection assembly and the contact pieces of the main body connection assembly, the main body connection assembly, the flexible assembly and the draw-out device connection assembly forming a conductive path;

wherein the contact pieces of the main body connection assembly are offset by adapting to a position deviation of the main body busbar, so that the contact pieces close to and clamp the main body busbar, and the flexible assembly absorbs the offset of the contact pieces by deformation of the flexible assembly, the offset is not transferred to the draw-out device connection assembly;

the linkage mechanism connects the clamping mechanisms of the two electrical connection devices, and the linkage mechanism enables the clamping mechanisms of the two electrical connection devices to act in synchronization;

wherein the main body connection assembly comprises:

the contact pieces, closing to and clamping the main body busbar, and being connected to the flexible assembly;

the clamping mechanism, applying a clamping force from an outer side of the contact pieces, so that the contact pieces shrink inward so as to tightly close to and clamp the main body busbar;

a reset mechanism, applying a reset force from an inner side of the contact pieces, so that the contact pieces expand outward to reset;

wherein the clamping mechanism comprises: a fastener, a bearing member, an elastic member and a force applying member;

the fastener is installed on the contact pieces, the contact pieces shrink inward when the fastener is tightened;

the elastic member and the force applying member apply the clamping force to the contact pieces;

the bearing member is installed between the fastener and the elastic member, the bearing member absorbs a rotation caused by an action of the fastener, so that the rotation is not transmitted to the elastic member and the force applying member;

wherein there are two contact pieces, the two contact pieces are close to and clamp the main body busbar from both sides, the fastener is installed on the two contact pieces, and the two contact pieces shrink inward when the fastener is tightened, the reset mechanism is installed on the inner side of the two contact pieces, and the reset mechanism makes the two contact pieces expand outward to reset;

wherein the fastener includes a bolt and a nut, the bearing member is a plane bearing, the elastic member is a disc spring assembly, and the force applying member is a pressure plate;

screw holes are provided on the contact pieces for the bolt to pass through, the bolt passes through a first contact piece and a second contact piece sequentially from the outer side of the first contact piece, and the nut is mounted on a second end of the bolt from the outer side of the second contact piece;

the plane bearing, the disc spring assembly and the pressure plate are installed between a first end of the bolt and the first contact piece, and the disc spring assembly includes a plurality of disc springs;

when the bolt and the nut rotate relative to each other and shrink, the two contact pieces shrink inward, and the disc spring assembly and the pressure plate apply clamping force to the contact pieces;

the plane bearing absorbs the relative rotation of the bolt and the nut, so that the disc springs and the pressure plate do not rotate.

10. The linked electrical connection assembly according to claim 9, wherein the linkage mechanism is an insulating transmission member, the insulating transmission member connects the fasteners of the two electrical connection devices so that the fasteners of the two electrical connection devices act in synchronization.

11. The linked electrical connection assembly according to claim 9, wherein the linkage mechanism is an insulating transmission member, and both ends of the insulating transmission member are provided with interfaces, the interfaces at both ends are respectively connected to the bolts of the two electrical connection devices, so that the bolts of the two electrical connection devices rotate in synchronization.

12. The linked electrical connection assembly according to claim 9, wherein the reset mechanism is a reset spring, the reset spring is mounted on the bolt, and the reset spring is positioned between the two contact pieces or the two pressure plates, when the bolt and the nut rotate relative to each other and shrink, the reset spring is compressed, when the bolt and the nut rotate relative to each other and expand, the reset spring restores, the reset spring applies spring force to the inner sides of the two contact pieces or the two pressure plates, causing the two contact pieces to expand outward.

13. An electrical appliance with a draw-out structure, comprising a main body and a draw-out device, wherein the main body and the draw-out device have a separation position and an insertion position, wherein the main body and the draw-out device are connected by the electrical connection device as claimed in claim 9, wherein, in the separation position, the main body exits the draw-out device, the main body busbar is separated from the main body connection assembly, and the main body busbar does not contact with the contact pieces;

in the insertion position, the main body is pushed into the draw-out device, the main body busbar is inserted into the main body connection assembly, and the contact pieces close to and clamp the main body busbar.

14. A linked electrical connection assembly includes two electrical connection devices and a linkage mechanism connecting the two electrical connection devices, wherein, the two electrical connection devices are connected between a main body and a draw-out device of an electrical appliance with a draw-out structure, the two electrical connection devices are respectively connected to an inlet end and an outlet end of the electrical appliance, the electrical connection device comprises:

a draw-out device connection assembly, including connection pieces being fixed on the draw-out device and electrically connected to the inlet and outlet ends of the draw-out device;

a main body connection assembly, including contact pieces with a clamping mechanism, the clamping mechanism making the contact pieces close to and clamp a main body busbar;

a flexible assembly, connecting the connection pieces of the draw-out device connection assembly and the contact pieces of the main body connection assembly, the main body connection assembly, the flexible assembly and the draw-out device connection assembly forming a conductive path;

wherein the contact pieces of the main body connection assembly are offset by adapting to a position deviation of the main body busbar, so that the contact pieces close to and clamp the main body busbar, and the flexible assembly absorbs the offset of the contact pieces by deformation of the flexible assembly, the offset is not transferred to the draw-out device connection assembly;

the linkage mechanism connects the clamping mechanisms of the two electrical connection devices, and the linkage mechanism enables the clamping mechanisms of the two electrical connection devices to act in synchronization;

wherein the main body connection assembly comprises:

the contact pieces, closing to and clamping the main body busbar, and being connected to the flexible assembly;

the clamping mechanism, applying a clamping force from an outer side of the contact pieces, so that the contact pieces shrink inward so as to tightly close to and clamp the main body busbar;

a reset mechanism, applying a reset force from an inner side of the contact pieces, so that the contact pieces expand outward to reset;

wherein the clamping mechanism comprises: a fastener, a bearing member, an elastic member and a force applying member;

the fastener is installed on the contact pieces, the contact pieces shrink inward when the fastener is tightened;

the elastic member and the force applying member apply the clamping force to the contact pieces;

the bearing member is installed between the fastener and the elastic member, the bearing member absorbs a rotation caused by an action of the fastener, so that the rotation is not transmitted to the elastic member and the force applying member;

wherein there are two contact pieces, the two contact pieces are close to and clamp the main body busbar from both sides, the fastener is installed on the two contact pieces, and the two contact pieces shrink inward when the fastener is tightened, the reset mechanism is installed on the inner side of the two contact pieces, and the reset mechanism makes the two contact pieces expand outward to reset;

wherein the fastener includes a bolt and a nut, the bearing member is a plane bearing, the elastic member is a disc spring assembly, and the force applying member are pressure plates;

two pressure plates are respectively attached to outer sides of the two contact pieces and are respectively fixed with the two contact pieces, screw holes are provided on the pressure plates for the bolt to pass through, the bolt passes through a first pressure plate and a second pressure plate sequentially from the outer side of the first pressure plate, and the nut is mounted on a second end of the bolt from the outer side of the second pressure plate;

the plane bearing and the disc spring assembly are installed between a first end of the bolt and the first contact piece, and the disc spring assembly includes a plurality of disc springs;

when the bolt and the nut rotate relative to each other and shrink, the two pressure pieces shrink inward, and the disc spring assembly applies clamping force to the contact pieces through the pressure plates;

the plane bearing absorbs the relative rotation of the bolt and the nut, so that the disc springs and the pressure plate do not rotate.

15. The linked electrical connection assembly according to claim 14, wherein the linkage mechanism is an insulating transmission member, and both ends of the insulating transmission member are provided with interfaces, the interfaces at both ends are respectively connected to the bolts of the two electrical connection devices, so that the bolts of the two electrical connection devices rotate in synchronization.

16. A linked electrical connection assembly comprising an electrical connection device and a linkage mechanism, wherein the electrical connection device is connected between a main body and a draw-out device of an electrical appliance with a draw-out structure, the electrical appliance has multiple phases, and the electrical connection device comprises:

a draw-out device connection assembly, including connection pieces being fixed on the draw-out device and electrically connected to the inlet and outlet ends of the draw-out device;

a plurality of main body connection assemblies, each main body connection assembly corresponding to one of the phases of the electrical appliance, each main body connection assembly including contact pieces with a clamping mechanism, the clamping mechanism making the contact pieces close to and clamp a main body busbar;

a flexible assembly, connecting the connection pieces of the draw-out device connection assembly and the contact pieces of the main body connection assembly, the main body connection assembly, the flexible assembly and the draw-out device connection assembly forming a conductive path;

wherein the contact pieces of the main body connection assembly are offset by adapting to a position deviation of the main body busbar, so that the contact pieces close to and clamp the main body busbar, and the flexible assembly absorbs the offset of the contact pieces by deformation of the flexible assembly, the offset is not transferred to the draw-out device connection assembly;

the linkage mechanism connects the clamping mechanisms of the plurality of main body connection assemblies, and the linkage mechanism enables the clamping mechanisms of the plurality of main body connection assemblies to act in synchronization;

wherein the main body connection assembly comprises:

the contact pieces, closing to and clamping the main body busbar, and being connected to the flexible assembly;

the clamping mechanism, applying a clamping force from an outer side of the contact pieces, so that the contact pieces shrink inward so as to tightly close to and clamp the main body busbar;

a reset mechanism, applying a reset force from an inner side of the contact pieces, so that the contact pieces expand outward to reset;

wherein the clamping mechanism comprises: a fastener, a bearing member, an elastic member and a force applying member;

the fastener is installed on the contact pieces, the contact pieces shrink inward when the fastener is tightened;

the elastic member and the force applying member apply the clamping force to the contact pieces;

the bearing member is installed between the fastener and the elastic member, the bearing member absorbs a rotation caused by an action of the fastener, so that the rotation is not transmitted to the elastic member and the force applying member;

wherein there are two contact pieces, the two contact pieces are close to and clamp the main body busbar from both sides, the fastener is installed on the two contact pieces, and the two contact pieces shrink inward when the fastener is tightened, the reset mechanism is installed on the inner side of the two contact pieces, and the reset mechanism makes the two contact pieces expand outward to reset;

wherein the fastener includes a bolt and a nut, the bearing member is a plane bearing, the elastic member is a disc spring assembly, and the force applying member is a pressure plate;

screw holes are provided on the contact pieces for the bolt to pass through, the bolt passes through a first contact piece and a second contact piece sequentially from the outer side of the first contact piece, and the nut is mounted on a second end of the bolt from the outer side of the second contact piece;

the plane bearing, the disc spring assembly and the pressure plate are installed between a first end of the bolt and the first contact piece, and the disc spring assembly includes a plurality of disc springs;

when the bolt and the nut rotate relative to each other and shrink, the two contact pieces shrink inward, and the disc spring assembly and the pressure plate apply clamping force to the contact pieces;

the plane bearing absorbs the relative rotation of the bolt and the nut, so that the disc springs and the pressure plate do not rotate.

* * * * *